United States Patent
Yasui

(10) Patent No.: US 9,900,470 B2
(45) Date of Patent: Feb. 20, 2018

(54) STORAGE MEDIUM, SYMBOL ENTRY DEVICE, AND SYSTEM FOR ACCEPTING TOUCH INPUTS ON A DISPLAY

(71) Applicant: BROTHER KOGYO KABUSHIKI KAISHA, Nagoya-shi, Aichi-ken (JP)

(72) Inventor: Ryo Yasui, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/381,767

(22) Filed: Dec. 16, 2016

(65) Prior Publication Data

US 2017/0187924 A1    Jun. 29, 2017

(30) Foreign Application Priority Data

Dec. 24, 2015 (JP) .................. 2015-251640

(51) Int. Cl.
  *H04N 1/60* (2006.01)
  *H04N 1/44* (2006.01)
  *G06F 3/0346* (2013.01)
  *G06F 3/041* (2006.01)
  *H04N 1/00* (2006.01)
  *H04N 1/32* (2006.01)

(52) U.S. Cl.
  CPC ......... *H04N 1/4433* (2013.01); *G06F 3/0346* (2013.01); *G06F 3/0416* (2013.01); *H04N 1/00395* (2013.01); *H04N 1/00411* (2013.01); *H04N 1/00424* (2013.01); *H04N 1/32101* (2013.01); *G06F 2203/04104* (2013.01); *G06F 2203/04105* (2013.01); *H04N 2201/0082* (2013.01); *H04N 2201/3205* (2013.01)

(58) Field of Classification Search
  None
  See application file for complete search history.

(56) References Cited

U.S. PATENT DOCUMENTS 7,747,868 B2 * 6/2010 Park ..................... G06F 3/0233
                                                  455/410
8,954,877 B2 * 2/2015 Adams ................. G06F 1/1694
                                                  715/773

(Continued)

FOREIGN PATENT DOCUMENTS

JP    2009-187365 A    8/2009
JP    2012-203830 A    10/2012

*Primary Examiner* — Dung Tran
(74) *Attorney, Agent, or Firm* — Merchant & Gould P.C.

(57) ABSTRACT

A non-transitory computer-readable storage medium storing computer-readable instructions executable by a processor of a symbol entry device comprising a display, a first touch sensor and a second touch sensor, wherein the instructions, when executed by the processor, cause the symbol entry device to execute: displaying an entry screen including a plurality of entry locations; receiving a location signal from the first touch sensor and one of a first operation signal and a second operation signal; determining that a first symbol associated with an entry location has been entered; determining that a second symbol associated with the entry location and different from the first symbol has been entered; and storing information corresponding to a determined symbol in memory for inclusion in authentication information, the determined symbol being based on one of the first symbol or the second symbol.

31 Claims, 12 Drawing Sheets

(56) References Cited

U.S. PATENT DOCUMENTS

| | | | | |
|---|---|---|---|---|
| 8,970,634 B2* | 3/2015 | Homma | ............... | G06F 3/044 |
| | | | | 345/173 |
| 9,552,042 B2* | 1/2017 | Nandakumar | ........ | G06F 1/3212 |
| 9,639,204 B2* | 5/2017 | Kim | ............... | G06F 3/0416 |
| 2002/0196274 A1* | 12/2002 | Comfort | ............... | G06F 21/31 |
| | | | | 715/741 |
| 2003/0110402 A1* | 6/2003 | Park | ............... | G06F 3/0233 |
| | | | | 726/18 |
| 2007/0033647 A1* | 2/2007 | Yang | ............... | G06F 21/83 |
| | | | | 726/18 |
| 2010/0002878 A1* | 1/2010 | Foong | ............... | G06F 21/31 |
| | | | | 380/54 |
| 2011/0260994 A1* | 10/2011 | Saynac | ............... | G06F 3/0414 |
| | | | | 345/173 |
| 2012/0200515 A1* | 8/2012 | Yamada | ............... | G06F 1/1626 |
| | | | | 345/173 |
| 2012/0326839 A1* | 12/2012 | Du | ............... | G06F 21/31 |
| | | | | 340/5.54 |
| 2013/0135658 A1* | 5/2013 | Kogure | ............... | G06F 3/1292 |
| | | | | 358/1.14 |
| 2016/0093131 A1* | 3/2016 | Schuette | ............ | G07C 9/00674 |
| | | | | 726/3 |
| 2016/0188264 A1* | 6/2016 | Shintani | ............... | G06F 3/1205 |
| | | | | 358/1.15 |
| 2016/0188855 A1* | 6/2016 | Bezjian | ............... | G06F 21/316 |
| | | | | 726/7 |
| 2016/0350548 A1* | 12/2016 | Lewis | ............... | G06F 21/6218 |
| 2017/0068381 A1* | 3/2017 | Choi | ............... | G06F 3/0416 |
| 2017/0147150 A1* | 5/2017 | Lee | ............... | G06F 3/0418 |

\* cited by examiner

Fig.2A

| PIN | 1744 |
|---|---|
| IMAGE DATA | PHOTOGRAPH.JPEG |

Fig.2B

| ORIENTATION INFORMATION | ON |
|---|---|

Fig.2C

| OPERATION INFORMATION | SYMBOL |
|---|---|
| TAP | 1 |
| PEEK | 7 |
| POP | 4 |

Fig.9A

| ENTRY LOCATION IMAGE | OPERATION INFORMATION | SEQUENCE INFORMATION |
|---|---|---|
| 131 | TAP | 2 |
| 132 | PEEK | 4 |
| 133 | POP | 3 |
| 134 | PEEK | 1 |

Fig.9B

| ENTRY CONFIRMATION IMAGE | OPERATION INFORMATION | LOCATION INFORMATION |
|---|---|---|
| 161 | TAP | (12,12) |
| 162 | PEEK | (45,55) |
| 163 | POP | (60,80) |
| 164 | PEEK | (75,15) |

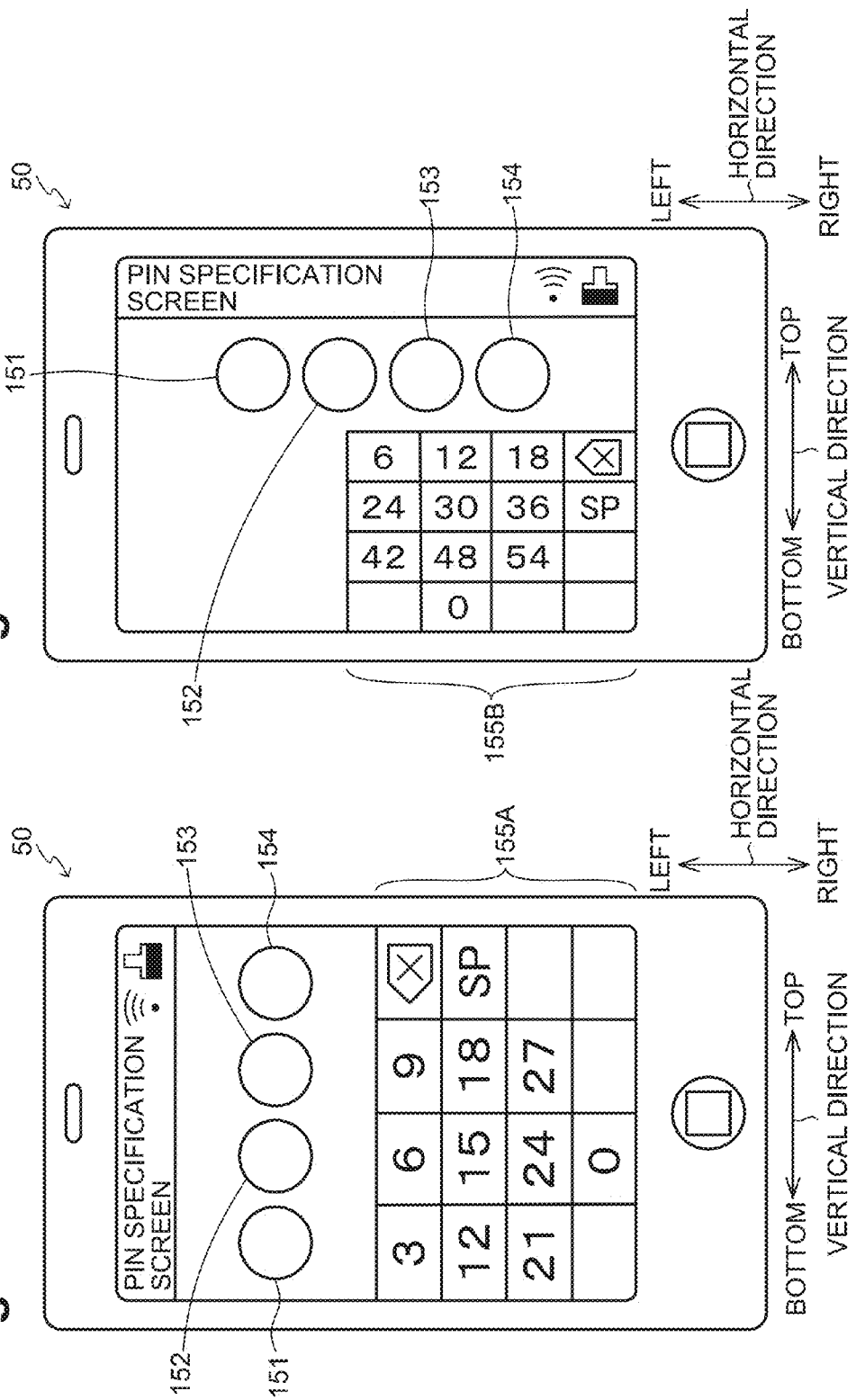

STORAGE MEDIUM, SYMBOL ENTRY DEVICE, AND SYSTEM FOR ACCEPTING TOUCH INPUTS ON A DISPLAY

CROSS-REFERENCE TO RELATED APPLICATION

This application claims priority from Japanese Patent Application No. 2015-251640, filed on Dec. 24, 2015, which is incorporated herein by reference in its entirety.

TECHNICAL FIELD

The disclosure relates to a symbol entry device for accepting an entry of a symbol through a touch panel.

BACKGROUND

A known entry device accepts an entry of a symbol through a software keyboard displayed on a display device equipped with a touch panel. More specifically, for example, the software keyboard includes a plurality of icons associated with respective enterable symbols. In response to specification of one of the plurality of icons, the entry device displays a symbol associated with the specified icon in a textbox.

SUMMARY

An increase in the number of icons to be included in the software keyboard may aggravate difficulty of finding a desired symbol in the entry device. As opposed to this, a decrease in the number of icons to be included in the software keyboard may increase the number of operations of switching among different software keyboards for entering a desired symbol. Such issues may be more conspicuous in an entry device having a relatively-small-sized display surface.

Accordingly, some embodiments of the disclosure provide for a symbol entry device that may enable a user to enter a desired symbol with less operations.

According to the one or more aspects of the disclosure, a non-transitory computer-readable storage medium storing computer-readable instructions executable by a processor of a symbol entry device comprising a display having a display surface, a first touch sensor and a second touch sensor. The first touch sensor comprises a location sensor and the second touch sensor comprises a sensor of a different type as compared to the location sensor. The instructions, when executed by the processor, cause the symbol entry device to execute: displaying, on the display surface, an entry screen including a plurality of entry locations; receiving a location signal from the first touch sensor and one of a first operation signal and a second operation signal from the second touch sensor in response to a touch operation on the display surface, the first operation signal being generated by the second touch sensor in response to the touch operation being a first touch operation, and the second operation signal being generated by the second touch sensor in response to the touch operation being a second touch operation different from the first touch operation, wherein the first touch operation and the second touch operation occur at a same one entry location on the display surface selected from among a plurality of entry locations; determining, in response to receiving the first operation signal from the second touch sensor, that a first symbol associated with an entry location has been entered; and determining, in response to receiving the second operation signal from the second touch sensor, that a second symbol associated with the entry location and different from the first symbol has been entered; and based on whether the first operation signal or second operation signal is received, storing information corresponding to a determined symbol in memory for inclusion in authentication information, the determined symbol being based on one of the first symbol or the second symbol.

According to the one or more aspects of the disclosure, a method comprising: displaying, on a display surface of a symbol entry device, an entry screen including a plurality of entry locations; receiving, in response to a touch operation at one entry location on the display surface selected from among a plurality of entry locations, (1) a location signal from a location sensor of the symbol entry device and (2) one of a first operation signal and a second operation signal from a touch sensor of the symbol entry device of a different type as compared to the location sensor, the first operation signal indicating a first touch operation and the second operation signal indicating a second touch operation, the second touch operation being different from the first touch operation, and wherein the first touch operation and the second touch operation occur at a same one entry location on the display surface selected from among a plurality of entry locations; determining, in response to receiving the first operation signal from the touch sensor, that a first symbol associated with an entry location has been entered; and determining, in response to receiving the second operation signal from the touch sensor, that a second symbol associated with the entry location and different from the first symbol has been entered; and based on whether the first operation signal or second operation signal is received, storing information corresponding to a determined symbol in a memory of the symbol entry device for inclusion in authentication information, the determined symbol being based on one of the first symbol or the second symbol.

According to the one or more aspects of the disclosure, in response to different touch operations on the same entry location, entries of different symbols may be accepted. Accordingly, a user may be enabled to entry a desired symbol with fewer operations. The "symbol" refers to letters and characters assigned with respective codes included in code sets (e.g., ASCII, JIS, and Unicode). The letters and characters may be, for example, alphabet letters, Arabic numerals, Roman numerals, Chinese characters, katakana characters, hiragana characters, and letters and characters used in languages other than the languages used in countries that use the above described letters and characters.

According to the one or more aspects of the disclosure, a system comprising: a symbol entry device comprising: a display having a display surface; a first touch sensor comprising a location sensor; a second touch sensor comprising a sensor of a different type as compared to the location sensor, the second touch sensor configured to output one of a first operation signal and a second operation signal in response to a touch operation on the display surface; a processor; and a memory storing computer-readable instructions therein. The instructions, when executed by the processor, cause the processor to perform: displaying, on the display surface, an entry screen including a plurality of entry locations; receiving a location signal from the first touch sensor and one of the first operation signal and the second operation signal from the second touch sensor in response to the touch operation on the display surface, the first operation signal being generated by the second touch sensor in response to the touch operation being a first touch operation, and the second operation signal being generated by the second touch sensor in response to the touch operation being a second touch operation different from the first touch operation, wherein the first touch operation and the second touch operation occur at a same one entry location on the display surface selected from among a plurality of entry locations; determining, in response to receiving the first operation signal from the second touch sensor, that a first symbol associated with an entry location has been entered; and determining, in response to receiving the second operation signal from the second touch sensor, that a second symbol associated with the entry location and different from the first symbol has been entered; and based on whether the first operation signal or second operation signal is received, storing information corresponding to a determined symbol in the memory for inclusion in authentication information, the determined symbol being based on one of the first symbol or the second symbol.

According to the one or more aspects of the disclosure, the first authentication information to be transmitted to the authentication device may be specified by the first operation and the second operation performed on the same entry location. Accordingly, as compared with a case where the first authentication information is specified through a software keyboard, this configuration may reduce a risk that the specified first authentication information is known to another person.

According to the one or more aspects of the disclosure, a non-transitory computer-readable storage medium storing computer-readable instructions executable by a processor of a symbol entry device comprising a display having a display surface, and a pressure sensor. The instructions, when executed by the processor, cause the symbol entry device to execute: displaying, on the display surface, an entry screen including a plurality of entry locations; receiving one of a first operation signal and a second operation signal from the pressure sensor in response to a touch operation on the display surface, the first operation signal being generated by the pressure sensor in response to the touch operation being a first touch operation having a pressure below a threshold, and the second operation signal being generated by the pressure sensor in response to the touch operation being a second touch operation having a pressure above the threshold, wherein the first touch operation and the second touch operation occur at a same one entry location on the display surface selected from among a plurality of entry locations; determining, in response to receiving the first operation signal from the pressure sensor, that a first symbol associated with an entry location has been entered; and determining, in response to receiving the second operation signal from the pressure sensor, that a second symbol associated with the entry location and different from the first symbol has been entered.

BRIEF DESCRIPTION OF THE DRAWINGS

Aspects of the disclosure are illustrated by way of example and not by limitation in the accompanying figures in which like reference characters indicate similar elements.

FIG. 2A illustrates example data to be stored in a data storage area of the image recording apparatus in the illustrative embodiment according to one or more aspects of the disclosure, wherein the data includes a personal identification number ("PIN") and image data received from the mobile terminal.

FIG. 2B illustrates example data to be stored in a data storage area of the mobile terminal in the illustrative embodiment according to one or more aspects of the disclosure, wherein the data includes orientation information.

FIG. 2C illustrates example data to be stored in the data storage area of the mobile terminal in the illustrative embodiment according to one or more aspects of the disclosure, wherein the data includes a correspondence between operation information and symbols.

FIG. 9A illustrates an example PIN in the first variation of the illustrative embodiment according to one or more aspects of the disclosure, wherein the PIN includes operation information and sequence information.

FIG. 9B illustrates an example PIN in a second variation of the illustrative embodiment according to one or more aspects of the disclosure, wherein the PIN includes operation information and location information.

FIG. 12A illustrates an example PIN specification screen in the fourth variation of the illustrative embodiment according to one or more aspects of the disclosure, wherein "OFF" has been specified for orientation information.

FIG. 12B illustrates another example PIN specification screen in the fourth variation of the illustrative embodiment according to one or more aspects of the disclosure, wherein "ON" has been specified for the orientation information.

DETAILED DESCRIPTION

Figure 1:
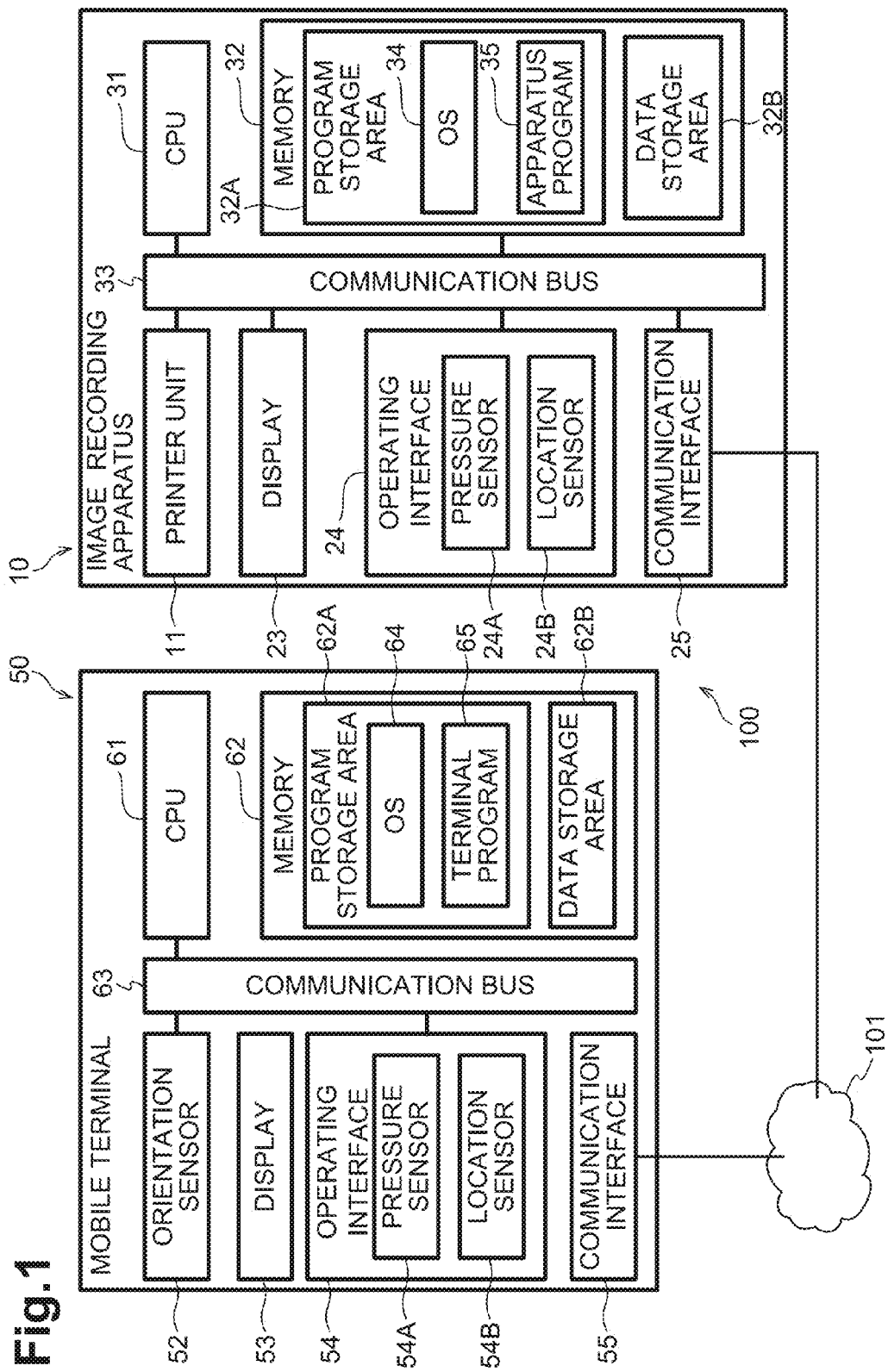
FIG. 1 is a block diagram illustrating an image recording apparatus and a mobile terminal constituting a system in an illustrative embodiment according to one or more aspects of the disclosure.

Illustrative embodiments will be described in detail with reference to the accompanying drawings, like reference numerals being used for like corresponding parts in the various drawings. The illustrative embodiments described below are merely examples. Various changes, arrangements and modifications may be applied therein without departing from the spirit and scope of the disclosure. For example, a sequence of execution of steps in each process may be changed appropriately without departing from the spirit and scope of the disclosure.

FIG. 1 is a schematic diagram illustrating a system 100 according to an illustrative embodiment. As illustrated in FIG. 1, the system 100 includes an image recording apparatus 10 and a mobile terminal 50. The image recording apparatus 10 and the mobile terminal 50 are configured to communicate with each other via a communication network 101. The communication network 101 may be, for example, one or a combination of a wired local-area network ("LAN") and a wireless LAN.

[Image Recording Apparatus 10]

As illustrated in FIG. 1, the image recording apparatus 10 includes a printer unit 11, a display 23, an operating interface 24, a communication interface 25, a central processing unit ("CPU") 31, a memory 32, and a communication bus 33. The printer unit 11, the display 23, the operating interface 24, the communication interface 25, the CPU 31, and the memory 32 are connected to each other via the communication bus 33. The image recording apparatus 10 is an example of each of an authentication device and a symbol entry device.

[Printer Unit 11]

The printer unit 11 performs a printing operation for recording an image represented by image data on a recording sheet. The recording sheet is an example of a sheet or a recording medium. The printer unit 11 may use a known recording method, e.g., an inkjet recording method or an electrophotographic recording method. The printer unit 11 is an example of each of an image processing unit and an image recording unit. In other embodiments, for example, the image recording apparatus 10 may further include, as another example of the image processing unit, a facsimile unit for transmitting and receiving image data using a system in compliance with a facsimile protocol.

[Display 23]

The display 23 includes a display surface for displaying various screens thereon. The display surface may be, for example, a plate-shaped transparent member (e.g., a glass plate) exposed at an exterior of the image recording apparatus 10. "Displaying various screens on the display surface" may refer to, for example, a state where a screen displayed on the display 23 is visually recognizable by a user through the display surface. The display 23 may be, for example, a liquid crystal display ("LCD") or an organic electroluminescence display ("OELD"). The display 23 of the image recording apparatus 10 is an example of a second display. The display surface of the display 23 is an example of a second display surface.

[Operating Interface 24]

The operating interface 24 may be an entry interface for accepting various user operations. The operating interface 24 includes a film-like pressure sensor 24A and a film-like location sensor 24B. The pressure sensor 24A and the location sensor 24B are laminated to the display surface of the display 23. That is, the display 23 is configured as a touch panel display. Each of the pressure sensor 24A and the location sensor 24B is an example of a touch sensor configured to output an operation signal responsive to a touch operation performed on the display surface of the display 23.

The pressure sensor 24A outputs, to the CPU 31, a pressure signal responsive to pressure applied to the display surface. In response to pressing the display surface with a pressing force weaker than a first pressure (hereinafter, this touch operation is referred to as a "tap operation" or "TAP".), the pressure sensor 24A outputs a first pressure signal. In response to pressing the display surface with a pressing force stronger than or equal to the first pressure and weaker than a second pressure (hereinafter, this touch operation is referred to as a "peek operation" or "PEEK".), the pressure sensor 24A outputs a second pressure signal. In response to pressing the display surface with a pressing force stronger than or equal to the second pressure (hereinafter, this touch operation is referred to as a "pop operation" or "POP".), the pressure sensor 24A outputs a third pressure signal. The second pressure is greater than the first pressure. The first pressure signal is an example of a first operation signal. Each of the second pressure signal and the third pressure signal is an example of a second operation signal.

The location sensor 24B outputs, to the CPU 31, a location signal responsive to a location where a touch operation is performed on the display surface. The location signal indicates coordinates (x, y) on an x-y plane, where, for example, an upper-right corner of the display surface is an origin point, a rightward direction is a plus direction of an x-axis, and a downward direction is a plus direction of a y-axis. When a touch operation is continued on a location of the display surface, the location sensor 24B outputs a location signal successively at predetermined detection intervals (e.g., every 10 msec). For example, in response to receipt of the same location signal predetermined successive times, the CPU 31 recognizes that a touch has been performed on a location indicated by the received location signals. A touch operation on a single location of the display surface over a duration shorter than a threshold duration is an example of a tap operation. A location signal indicating the same coordinates outputted successively for the duration shorter than the threshold duration is another example of the first operation signal. A touch operation on a single location of the display surface over a duration longer than or equal to the threshold duration is an example of a long touch operation. A location signal indicating the same coordinates outputted successively for the duration longer than or equal to the threshold duration is an example of another second operation signal.

In the illustrative embodiment, a "touch" includes general operations for contacting an input medium with the display surface. That is, the touch operation includes, for example, a slide operation, a flick operation, a pinch-in operation, and a pinch-out operation as well as a tap operation, a peek operation, a pop operation, and a long touch operation. A "touch" may also include operations for bringing the input medium into close proximity to the display surface but not contacting therewith. The input medium may be, for example, a user's fingertip or a stylus.

The operating interface 24 accepts a user operation for specifying an object displayed on the display surface of the display 23, based on one or both of a pressure signal and a location signal. The "object" may refer to an image that can be specified by the user through an operation on the operating interface 24. In one example, the object may be a text string, icon, button, link, checkbox, and/or radio button displayed on the display 23. The operating interface 24 accepts specification of an object through a touch operation on a location where the object is displayed.

Nevertheless, the operating interface 24 might not necessarily include the pressure sensor 24A. Whether the operating interface 24 includes the pressure sensor 24A or not may be determined based on, for example, a model name of the image recording apparatus 10. In other embodiments, for example, the operating interface 24 may include, a plurality of, for example, ten, pressing buttons assigned with respective symbols "0" to "9" instead of the pressure sensor 24A and the location sensor 24B laminated to the display 23. In this case, in response to pressing of one of the pressing buttons, an apparatus program 35 may determine that a symbol assigned to the pressed button has been entered.

[Communication Interface 25]

The communication interface 25 may be an interface for enabling the image recording apparatus 10 to communicate with an external device through the communication network 101. That is, the image recording apparatus 10 outputs various information to the mobile terminal 50 via the communication interface 25 and receives various data or information from the mobile terminal 50 via the communication interface 25. A communication system to be used by the communication interface 25 is not limited to a specific system. In one example, WiFi® (WiFi® is a registered certification mark owned by the Wi-Fi Alliance of Austin, Tex.) may be used. Nevertheless, the communication interface 25 is not limited to the specific example. In other embodiments, for example, the communication interface 25 may be a Universal Serial Bus ("USB") interface to and from which a USB cable is attached and detached. The communication interface 25 of the image recording apparatus 10 is an example of a second communication interface.

[CPU 31]

The CPU 31 is configured to control overall operations of the image recording apparatus 10. The CPU 31 executes various programs by acquiring the programs from the memory 32 in accordance with various signals outputted from the operating interface 24 and various information acquired from an external device via the communication interface 25. The CPU 31 is an example of a second processor and the memory 32 is an example of a second memory.

[Memory 32]

The memory 32 includes a program storage area 32A and a data storage area 32B. The program storage area 32A stores an operating system ("OS") 34 and the apparatus program 35. The apparatus program 35 may be implemented as a single program or as a set of programs. The data storage area 32B stores data or information necessary for execution of the apparatus program 35.

In the illustrative embodiments, "data" and "information" have a commonality in that both are a computer-treatable bit or bit string. "Data" may be something that can be treated by the computer irrespective of a description of each bit. "Information" may be something that influences operations of the computer depending on a description of each bit. An "instruction" may be a control signal for prompting a destination device to perform a subsequent operation, and may include information or itself may have a nature of information.

Even if "data" or "information" has different formats (e.g., a text format, a binary format, or a flag format) in different computers, the "data" or "information" is treated as the same data or information unless the "data" or "information" indicates the same description in the computers. For example, one computer may have information indicating "2" in a text format represented by the ASCII code "0×32", and another computer may have the same information indicating "2" in binary format represented by the binary system "10".

Nevertheless, "data" and "information" are not strictly distinguished from each other, and may be treated exceptionally. For example, data may be treated as information temporarily or information may be treated as data temporarily. Data or information may be treated in one device as the same and may be treated in another device as the other. Information may be extracted from data or data may be extracted from information.

The memory 32 includes one or a combination of, for example, a random access memory ("RAM"), a read-only memory ("ROM"), an electrically erasable programmable read-only memory ("EEPROM"), a hard disk drive ("HDD"), and a buffer of the CPU 31.

The memory 32 may be a computer-readable storage medium. The computer-readable storage medium may be a non-transitory medium. The non-transitory medium include, for example, recording media, such as CD-ROMs and DVD-ROMs, as well as the above-described examples. The non-transitory medium may be a tangible medium. An electrical signal carrying a program downloaded from a server on the Internet may be a computer-readable signal medium which is one of computer-readable media. Nevertheless, the electrical signal might not be included in a non-transitory computer-readable storage medium.

Each program stored in the program storage area 32A is executed by the CPU 31. Nevertheless, in the description below, an operation of each program may be described with the CPU 31 omitted. That is, in the description below, a phrase that "a program A executes a process A" may refer to "the CPU 31 executes a process A described in a program A". The same interpretation may be applied to the mobile terminal 50.

Each program stored in the program storage area 32A determines an event and operates in accordance with the determination result. Nevertheless, in the description below, an operation of each program may be described with a determination omitted. That is, in the description below, a phrase that "based on a condition A, the program executes a process A" may refer to "the program determines whether a condition A is satisfied. Based on a positive determination, the program executes a process A". The same interpretation may be applied to the mobile terminal 50.

Each program stored in the program storage area 32A specifies, acquires, extracts, determines, or selects data. "The program specifies data" may refer to, for example, a process in which the program specifies data matching a condition from a plurality of pieces of data and stores the data as it is or information for identifying the data in a predetermined storage area. The information for identifying data may be, for example, identification information for identifying the data, an array index in which the data is stored, or a pointer indicating the storage area in which the data is stored. A similar interpretation may be applied to a process in which the program acquires, extracts, determines, or selects data. The same interpretation may be applied to the mobile terminal 50.

The OS 34 may be a basic program that provides an application programming interface ("API") for controlling the plurality of hardware of the image recording apparatus 10, such as the printer unit 11, the display 23, the operating interface 24, and the communication interface 25. That is, each of the programs controls corresponding one or more of the plurality of hardware by calling up the API provided by the OS 34. Nevertheless, in the description below, an operation of each program may be described with the OS 34 omitted. That is, in the description below, a phrase that "a program B controls hardware C" may refer to "a program B controls hardware C via the API of the OS 34". The same interpretation may be applied to the mobile terminal 50.

As illustrated in FIG. 2A, the data storage area 32B of the image recording apparatus 10 is configured to store a personal identification number ("PIN") and image data associated with the PIN. The apparatus program 35 stores, in the data storage area 32B, a PIN and image data, both of which are received from the mobile terminal 50 via the communication interface 25.

[Mobile Terminal 50]

As illustrated in FIG. 1, the mobile terminal 50 includes an orientation sensor 52, a display 53, an operating interface 54, a communication interface 55, a CPU 61, a memory 62, and a communication bus 63, which are accommodated in a housing of the mobile terminal 50. The housing of the mobile terminal 50 may have a thin flat rectangular shape having longer and shorter sides. The display 53, the operating interface 54, the communication interface 55, the CPU 61, the memory 62, and the communication bus 63 of the mobile terminal 50 may have the same or similar configuration to the display 23, the operating interface 24, the communication interface 25, the CPU 31, the memory 32, and the communication bus 33 of the image recording apparatus 10. Therefore, a detailed explanation of such components will be omitted. The display 53 is an example of a first display. The communication interface 55 is an example of a first communication interface. The CPU 61 is an example of a first processor and the memory 62 is an example of a first memory. The mobile terminal 50 is an example of a specification device and is another example of the symbol entry device.

The mobile terminal 50 may be, for example, a mobile phone, a smartphone, or a tablet terminal. More specifically, for example, the display 53 of the mobile terminal 50 has a display of, preferably, 12 inch or smaller, more preferably, 8 inch or smaller. Nevertheless, the specification device is not limited to the specific example, e.g., the mobile terminal 50, but may be, for example, a personal computer.

As illustrated in FIGS. 6A, 6B 7A, 7B, 10A, 10B, 12A, and 12B, for example, the display 53 of the mobile terminal 50 includes a rectangular display surface having longer and shorter sides. The display surface of the display 53 is exposed at an exterior of the housing of the mobile terminal 50 while the longer sides of the display surface extend along the longer sides of the housing and the shorter sides of the display surface extend along the shorter sides of the housing. The display surface of the display 53 is an example of a first display surface.

The orientation sensor 52 outputs, to the CPU 61, an orientation signal responsive to an orientation of the mobile terminal 50. More specifically, for example, the orientation sensor 52 outputs a first orientation signal responsive to the orientation of the mobile terminal 50 whose longer sides of the display surface extend along the vertical direction (refer to FIG. 7B). The orientation sensor 52 outputs a second orientation signal responsive to the orientation of the mobile terminal 50 whose the shorter sides of the display surface extend along the vertical direction (refer to FIG. 12B). The orientation sensor 52 is not limited to any particular sensor. In one example, the orientation sensor 52 may be a gyro sensor.

As illustrated in FIG. 2B, the data storage area 62B of the mobile terminal 50 is configured to store orientation information. The orientation information is specified with one of "OFF" (as an example of a first value) and "ON" (as an example of second value). The orientation information "OFF" corresponds to displaying, on the display surface, a symbol with its top to bottom orientation corresponds to a direction that the longer sides of the display surface extends. The orientation information "ON" corresponds to displaying, on the display surface, a symbol with its top to bottom orientation corresponding to the vertical direction.

That is, in a case where "OFF" is specified for the orientation information, the terminal program 65 does not change the orientation of the symbol displayed on the display surface irrespective of the orientation change of the mobile terminal 50. In a case where "ON" is specified for the orientation information, the terminal program 65 changes the orientation of the symbol displayed on the display surface in response to the orientation change of the mobile terminal 50. The "top to bottom orientation of a symbol" may refer to an orientation of a symbol for representing its meaning most naturally.

As illustrated in FIG. 2C, the data storage area 62B is capable of storing operation information and a symbol assigned to the operation information. The operation information represents a touch operation acceptable through the operating interface 54. In an example of FIG. 2C, the operation information includes "TAP", "PEEK", and "POP". The symbol represents a symbol which is to be determined as having been entered in response to acceptance of a touch operation indicated by operation information associated with the symbol. A correspondence between operation information and symbol may be changed in a particular process.

[Operation of System 100]

Figure 3:
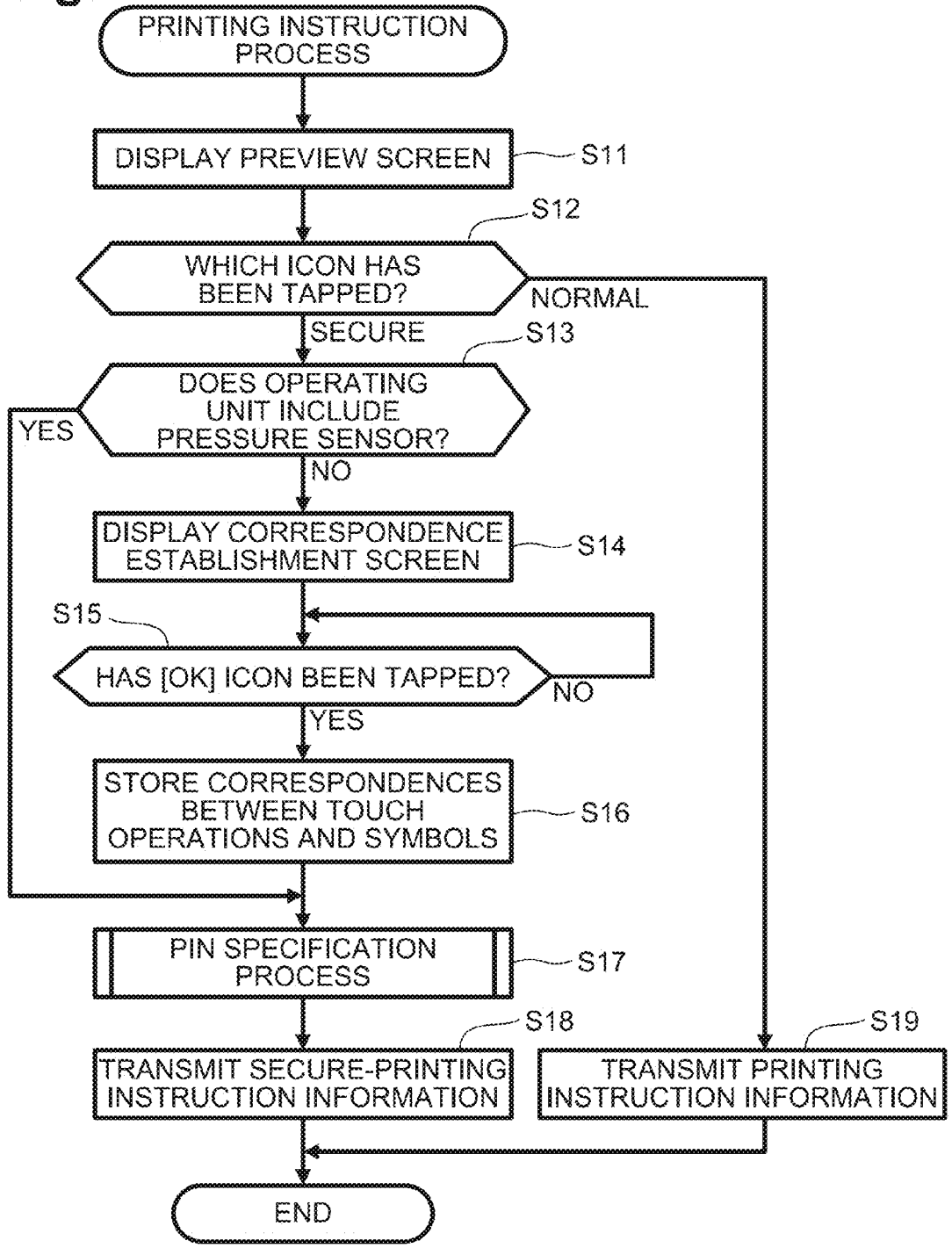
FIG. 3 is a flowchart illustrating an example printing instruction process in the illustrative embodiment according to one or more aspects of the disclosure.
Figure 4:
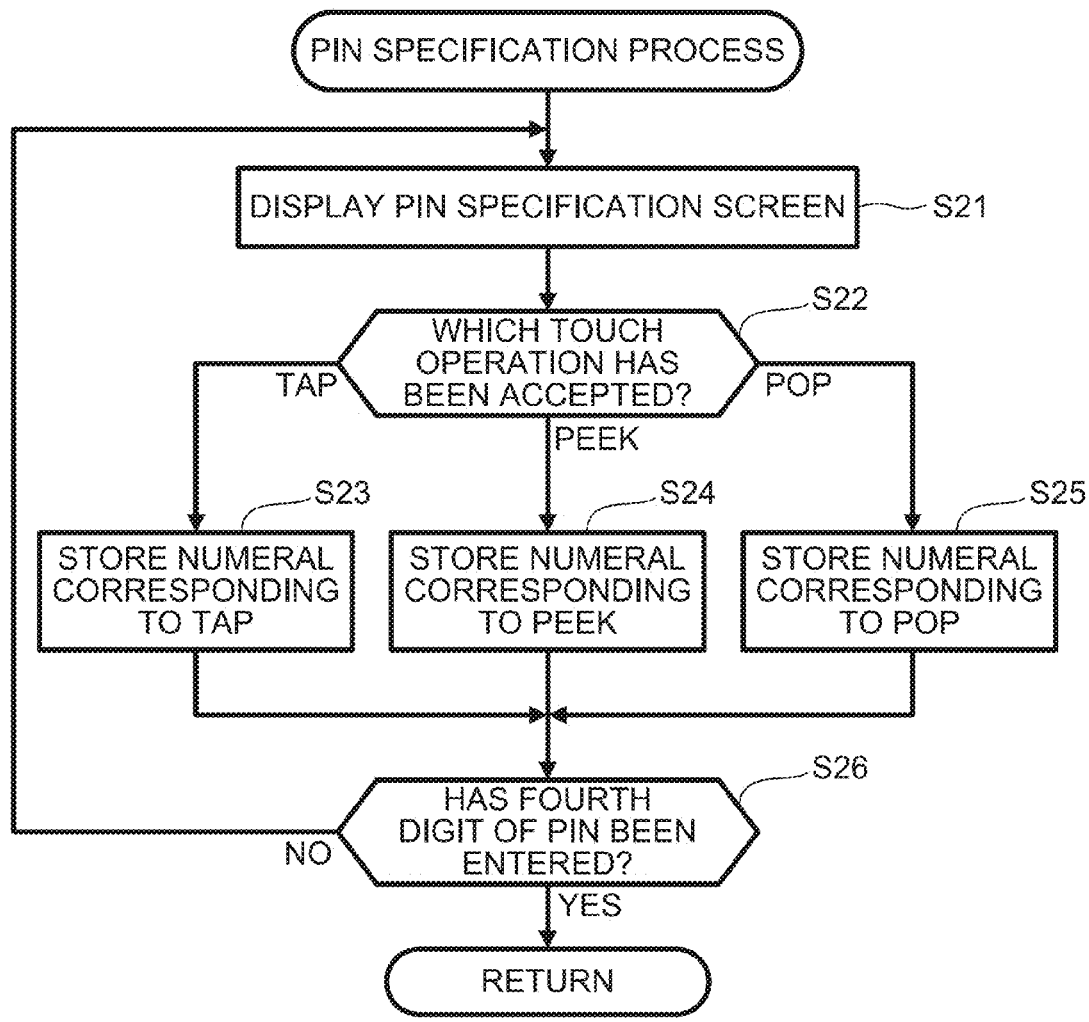
FIG. 4 is a flowchart illustrating an example PIN specification process in the illustrative embodiment according to one or more aspects of the disclosure.
Figure 5:
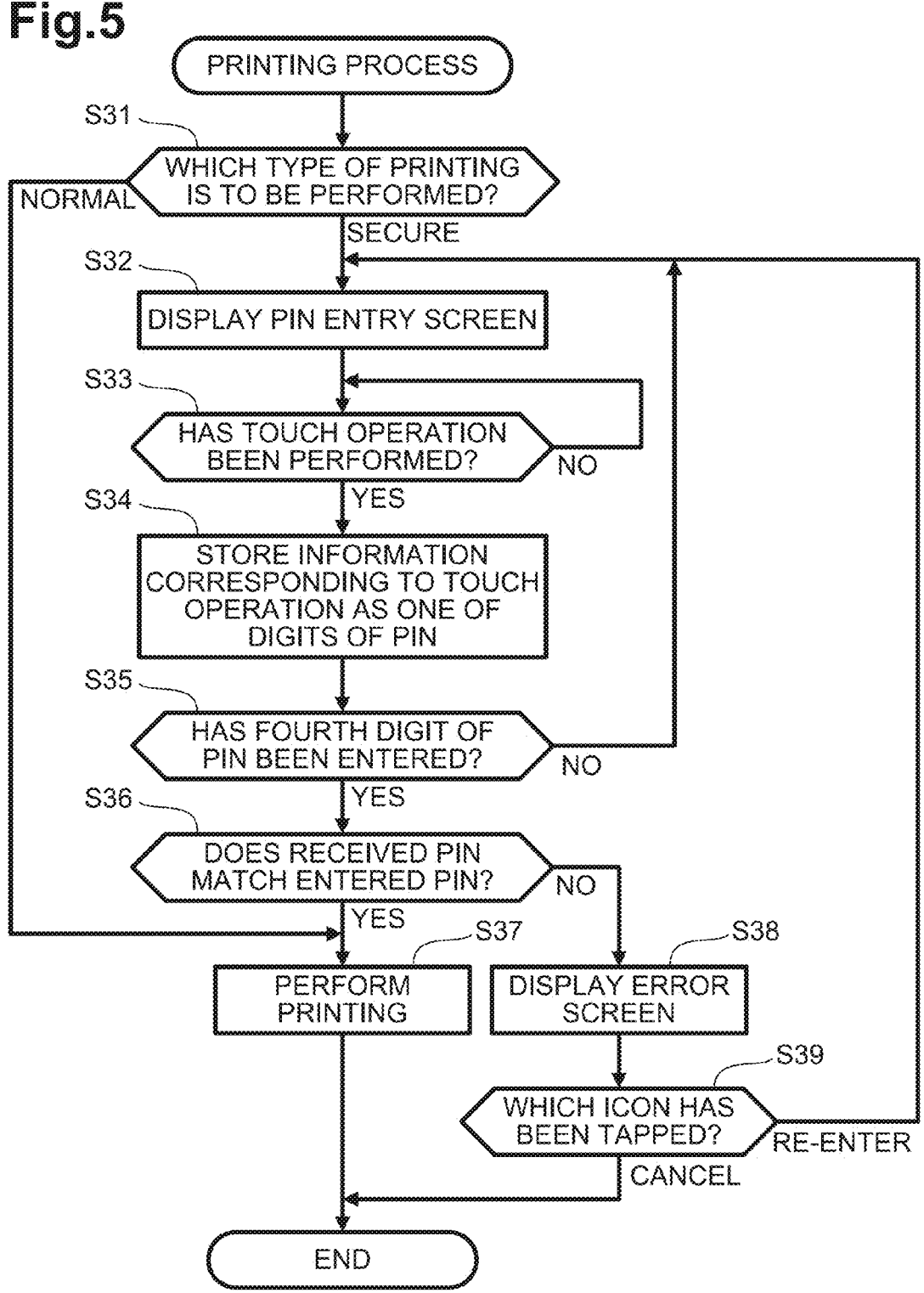
FIG. 5 is a flowchart illustrating an example printing process in the illustrative embodiment according to one or more aspects of the disclosure.

Referring to FIGS. 3, 4, and 5, an operation of the system 100 will be described. The system 100 causes the image recording apparatus 10 to perform printing of image data specified by the user through the mobile terminal 50.

Figure 6A:
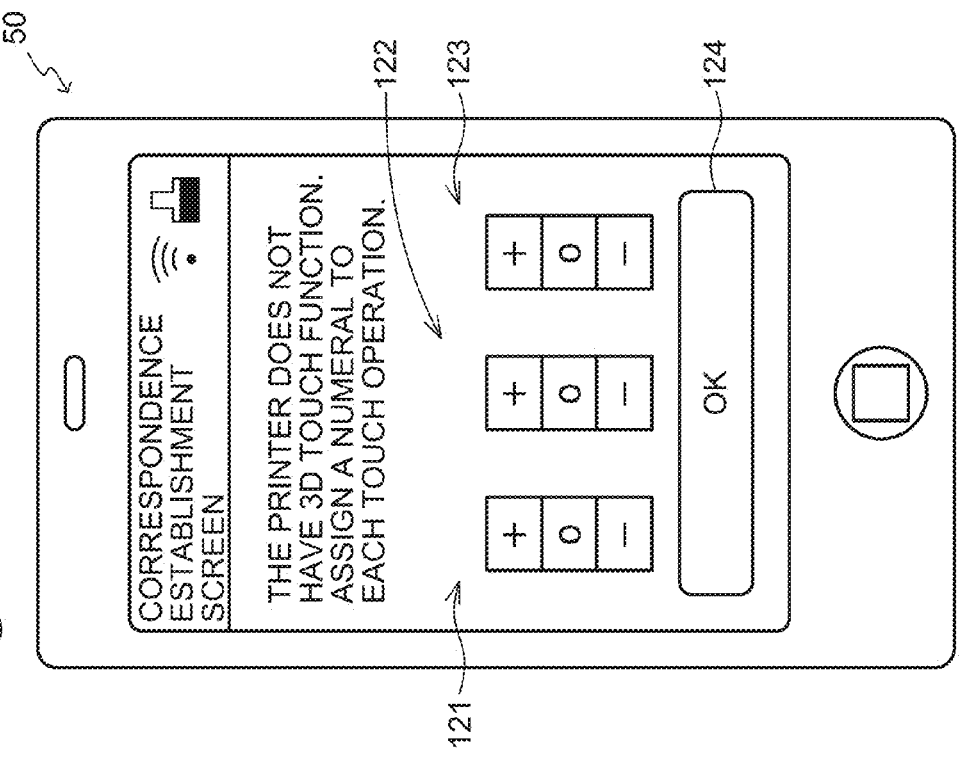
FIG. 6A illustrates an example preview screen that is one of example screens to be displayed on a display of the mobile terminal in the illustrative embodiment according to one or more aspects of the disclosure.

Referring to FIG. 3, a printing instruction process will be described. As illustrated in FIG. 3, the terminal program 65 of the mobile terminal 50 displays a preview screen on the display 53 (e.g., step S11). FIG. 6A illustrates an example of the preview screen. The preview screen illustrated in FIG. 6A includes a preview image 111, a [SECURE] icon 112, and a [PRINT] icon 113. Subsequent to step S11, the terminal program 65 accepts a user operation on the preview screen via the operating interface 54 (e.g., step S12).

The preview image 111 represents a result image to be acquired from printing of image data specified by the user through the operating interface 54. That is, prior to step S11, the terminal program 65 accepts, through the operating interface 54, a user operation for specifying a piece of image data from one or more pieces of image data stored in the data storage area 62B or from one or more pieces of image data stored in a storage server (not illustrated). In the illustrative embodiment, it is assumed that image data "photograph.JPEG" has been specified.

The [SECURE] icon 112 corresponds to an instruction for executing secure printing. The [PRINT] icon 113 corresponds to an instruction for executing printing which is not secure printing (hereinafter, referred to as "normal printing"). In secure printing, for example, the mobile terminal 50 transmits image data and a PIN both specified by the user to the image recording apparatus 10 and the image recording device 10 prints the image data in response to acceptance of entry of a valid PIN.

In response to acceptance of a tap operation on a location corresponding to the [SECURE] icon 112 through the operating interface 54 (e.g., SECURE in step S12), the terminal program 65 determines whether the operating interface 24 of the image recording apparatus 10 includes the pressure sensor 24A (e.g., step S13). In other words, in step S13, the terminal program 65 determines whether the operating interface 24 of the image recording apparatus 10 has a function of outputting different operation signals in accordance with different touch operations on the same particular entry location of the display surface with different pressing forces.

In one example, in step S13, the terminal program 65 may inquire of the image recording apparatus 10 whether the image recording apparatus 10 includes the pressure sensor 24A. In another example, in step 13, the terminal program 65 may refer to a correspondence between a model name of the image recording apparatus 10 and the presence or absence of the pressure sensor 24A stored in a database. The database may be stored in the data storage area 62B of the mobile terminal 50 or in a server (not illustrated) on the Internet. Whether the image recording apparatus 10 includes the pressure sensor 24A or not corresponds to whether the image recording apparatus 10 has a 3D Touch function or not.

Figure 6B:
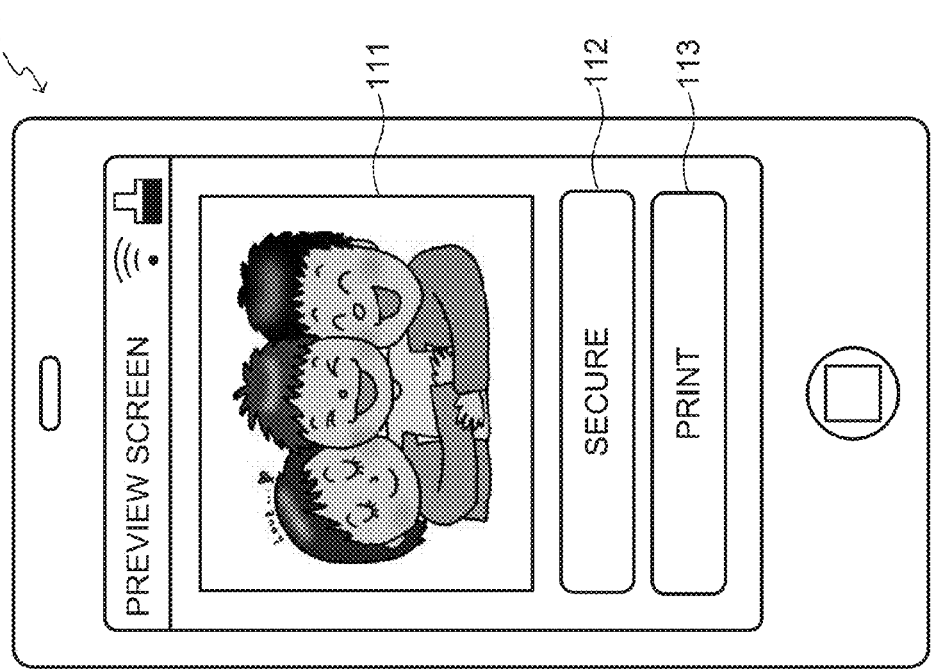
FIG. 6B illustrates a correspondence establishment screen that is one of the example screens to be displayed on the display of the mobile terminal in the illustrative embodiment according to one or more aspects of the disclosure.

In a case where the terminal program 65 determines that the image recording apparatus 10 does not include the pressure sensor 24A (e.g., NO in step S13), the terminal program 65 displays a correspondence establishment screen on the display 53 (e.g., step S14). FIG. 6B illustrates an example of the correspondence establishment screen. The correspondence establishment screen illustrated in FIG. 6B includes a message indicating, for example, that "THE PRINTER DOES NOT HAVE 3D TOUCH FUNCTION. ASSIGN A NUMERAL TO EACH TOUCH OPERATION.", assignment interfaces 121, 122, and 123, and an [OK] icon 124. The terminal program 65 accepts a user operation on the correspondence establishment screen through the operating interface 54 (e.g., step S15).

The assignment interface 121 accepts assignment of a numeral to a tap operation. The assignment interface 121 includes a [+] icon for incrementing a numeric value, a [−] icon for decrementing a numeric value, and a textbox for displaying a numeric value assigned by an operation on the [+] icon and/or the [−] icon. The assignment interface 122 accepts assignment of a numeral to a peek operation. The assignment interface 123 accepts assignment of a numeral to a pop operation. The assignment interface 122 and the assignment interface 123 have the same or similar configuration to the assignment interface 121. The [OK] icon 124 corresponds to an instruction for finalizing the numerals assigned to the respective touch operations.

In response to acceptance of a tap operation on a location corresponding to the [OK] icon 124 through the operating interface 54 (e.g., YES in step S15), the terminal program 65 stores, in the data storage area 62B, the numerals accepted through the respective assignment interfaces 121, 121, and 123 in association with the touch operations of the operation information assigned to the respective assignment interfaces 121, 122, and 123 (e.g., step S16). For example, in a case where a location corresponding to the [+] icon of the assignment interface 121 is tapped once, a location corresponding to the [+] icon of the assignment interface 122 is tapped seven times, a location corresponding to the [+] icon of the assignment interface 123 is tapped four times, and then a location corresponding to the [OK] icon 124 is tapped, information illustrated in FIG. 2C is stored in the data storage area 62B.

The operation performed on one of the assignment interfaces 121, 122, and 123 is an example of a first assignment operation. The numeral assigned through the assignment interface 121 is an example of a first symbol assigned to the first operation signal. Each of the numerals assigned through the respective assignment interfaces 122 and 123 is an example of a second symbol assigned to the second operation signal. In a case where the terminal program 65 determines that the image recording apparatus 10 includes the pressure sensor 24A (e.g., YES in step S13), the terminal program 65 skips steps S14, S15, and S16 and executes step S17 and its subsequent steps.

The terminal program 65 executes a PIN specification process (e.g., step S17). The PIN specification process enables the user to specify a PIN for secure printing. In other words, the PIN specification process is for accepting entry of a PIN to be transmitted to the image recording apparatus 10 together with specified image data. Referring to FIG. 4, the PIN specification process will be described in detail. In the illustrative embodiment, a four-digit PIN will be specified as an example case. Nevertheless, the number of digits of the PIN is not limited to the specific example.

Figure 7A:
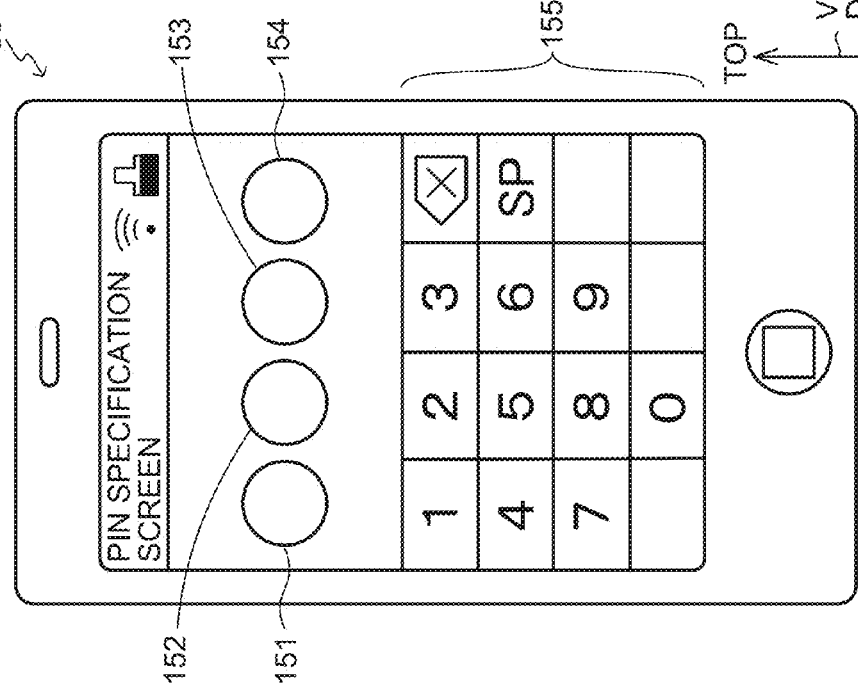
FIG. 7A illustrates an example PIN specification screen that is one of the example screens to be displayed on the display of the mobile terminal in the illustrative embodiment and its first variation according to one or more aspects of the disclosure.

The terminal program 65 displays a PIN specification screen (as an example of an entry screen) on the display 53 (e.g., step S21). FIG. 7A illustrates an example of the PIN specification screen. The PIN specification screen illustrated in FIG. 7A includes a message indicating, for example, that "SPECIFY A FOUR-DIGIT PIN." and entry location images 131, 132, 133, and 134. The entry location images 131, 132, 133, and 134 may represent locations at which respective digits of the PIN are to be entered on the display surface. The terminal program 65 accepts a touch operation onto the PIN specification screen through the operating interface 54 (e.g., step S22).

In response to acceptance of a tap operation on a location corresponding to the entry location image 131 through the operating interface 54 (e.g., TAP in step S22), the terminal program 65 stores a numeral "1" assigned to the tap operation in the data storage area 62B, as the first digit of the PIN (e.g., step S23). More specifically, in response to output of a first pressure signal from the pressure sensor 54A and a location signal representing a display location of the entry location image 131 from the location sensor 54B, the terminal program 65 determines that a tap operation on the location corresponding to the entry location image 131 has been accepted. In processes described below, determination may be made in the same or similar manner. Each of the pressure sensor 54A and the location sensor 54B is an example of a touch sensor.

In response to acceptance of a peek operation on a location corresponding to the entry location image 132 through the operating interface 54 (e.g., PEEK in step S22), the terminal program 65 stores a numeral "7" assigned to the peek operation in the data storage area 62B, as the second digit of the PIN (e.g., step S24). In response to acceptance of a pop operation on each of locations corresponding to the entry location image 133 and the entry location image 134, respectively, through the operating interface 54 (e.g., POP in step S22), the terminal program 65 stores a numeral "4" assigned to the pop operation in the data storage area 62B, as the third and fourth digits, respectively, of the PIN (e.g., step S25).

Until the terminal program 65 accepts a touch operation on each of the locations corresponding to the respective entry location images 131, 132, 133, and 134 in sequence from left (e.g., NO in step S26), the terminal program 65 repeats steps S22 to S25. In response to completion of the touch operations on the appropriate respective locations on the PIN specification screen, a PIN "1744" is stored in the data storage area 62B. That is, in accordance with the sequence in which the operation signals are outputted from the operating interface 54, the terminal program 65 generates, as a PIN, a symbol string "1744" in which the symbols assigned to the respective operation signals are arranged. The symbol string generated in the PIN specification process is an example of a first symbol string.

The terminal program 65 may display an acceptance image "*" at the locations corresponding to the entry location images 131, 132, 133, and 134 every time accepting a touch operation on each of the locations corresponding to the respective entry location images 131, 132, 133, and 134. The acceptance image "*" represents acceptance of entry of a symbol. The acceptance image may have any shape which may be different from all of the symbols "1", "7", and "4" which can be entered by the assigned touch operations on the locations corresponding to the respective entry location images 131, 132, 133, and 134.

In response to acceptance of a pop operation through the operating interface 54, in other words, in response to output of a third pressure signal from the pressure sensor 54A, the terminal program 65 may cause a notifying unit to notify of acceptance of a pop operation. The notification manner is not limited to any particular manner. For example, the terminal program 65 may cause the display 53 to blink, a speaker (not illustrated) to output guidance sound, or a vibrator (not illustrated) to vibrate. Each of the display 53, the speaker, and the vibrator is an example of the notifying unit.

In a case where the operating interface 24 of the image recording apparatus 10 includes the pressure sensor 24A, in steps S23 to S25, instead of the symbols assigned in steps S14 to S16, predetermined information may be stored as a PIN. In this case, the PIN is not limited to the symbol string. For example, the PIN may be binary data. In the image recording apparatus 10 and the mobile terminal 50, a tap operation may be assigned with "0b01", a peek operation may be assigned with "0b10", and a pop operation may be assigned with "0b11". In this case, in response to acceptance of a tap operation, a peek operation, a pop operation, and a pop operation on the respective locations corresponding to the entry location images 131, 132, 133, and 134 through the operating interface 54, the terminal program 65 may store "0b01101111" in the data storage area 62B as the PIN. "0b" indicates that a number string subsequent to "0b" is a bit string in binary notation.

The PIN specified in steps S22 to S25 is an example of first authentication information. "Determining that a symbol has been entered" includes, for example, one or more of storing an entered symbol in the data storage area 62B, displaying the entered symbol the display 53, and transmitting the entered symbol to an external device via the communication interface 55.

In response to acceptance of an appropriate touch operation on each of the locations corresponding to the entry location images 131, 132, 133, and 134 (e.g., YES in step S26), the terminal program 65 transmits secure-printing instruction information to the image recording apparatus 10 via the communication interface 55 (e.g., step S18 of FIG. 3). The secure-printing instruction information may be information for instructing execution of secure printing. The secure-printing instruction information includes the image data "photograph.JPEG" specified through the operating interface 54 and the PIN "1744" specified in the PIN specification process. In a case where the operating interface 24 of the image recording apparatus 10 includes the pressure sensor 24A, the secure-printing instruction information may include the PIN "0b01101111". Nevertheless, the explanation will be continued in the case where the secure-printing instruction information includes the PIN "1744".

In response to acceptance of a tap operation on a location corresponding to the [PRINT] icon 113 included in the preview screen through the operating interface 54 (e.g., PRINT in step S12), the terminal program 65 transmits printing instruction information to the image recording apparatus 10 via the communication interface 55 without executing steps S13 to S18 (e.g., step S19). The printing instruction information may be information for instructing execution of normal printing. The printing instruction information includes the image data "photograph.JPEG" specified through the operating interface 54 but not include the PIN. The secure-printing instruction information and the printing instruction information may differ from each other only in whether a PIN is included or not therein. In another example, the secure-printing instruction information and the printing instruction information may further include printing type information indicating a type of printing.

As illustrated in FIG. 5, the apparatus program 35 of the image recording apparatus 10 receives one of the secure-printing instruction information and the printing instruction information from the mobile terminal 50 via the communication interface 25 (e.g., step S31). In a case where the printing instruction information has been received (e.g., NORMAL in step S31), the apparatus program 35 stores the image data "photograph.JPEG" included in the printing instruction information in the data storage area 32B. The apparatus program 35 executes step S37 without executing steps S32 to S36. Based on the received instruction information not including a PIN or based on the printing type information of the received instruction information indicating "normal printing", the apparatus program 35 may determine that the printing instruction information has been received.

In a case where the secure-printing instruction information has been received (e.g., SECURE in step S31), the apparatus program 35 stores in the data storage area 32B, the PIN "1744" and image data "photograph.JPEG" both included in the secure-printing instruction information, in association with each other. Based on the received instruction information including a PIN or based on the printing type information of the received instruction information indicating "secure printing", the apparatus program 35 may determine that secure-printing instruction information has been received.

The apparatus program 35 displays a PIN entry screen (as another example of the entry screen) on the display 23 (e.g., step S32). The apparatus program 35 accepts a touch operation on the PIN entry screen through the operating interface 24 (e.g., step S33). The apparatus program 35 stores information corresponding to the accepted touch operation in the data storage area 32B as one of the digits of the PIN (e.g., step S34). The apparatus program 35 repeats steps S32 to S34 until entry of the fourth digit of the PIN is accepted (e.g., NO in step S35). The PIN entered in steps S32 to S35 is an example of second authentication information. A touch operation on the software keyboard 146 is an example of a second specification operation for specifying one of candidate symbols.

Figure 8A:
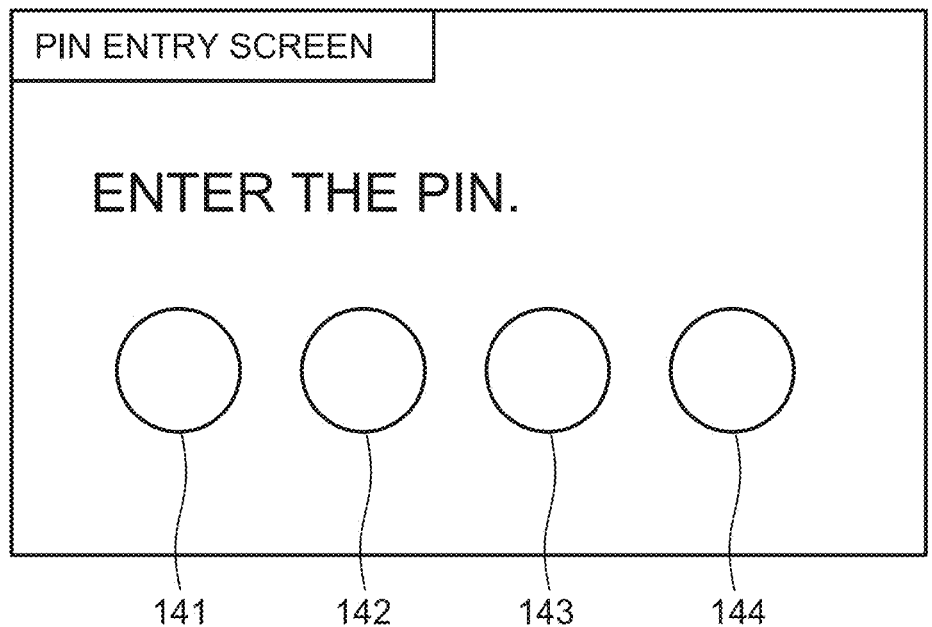
FIG. 8A illustrates an example PIN entry screen that is one of the example screens to be displayed on the display of the mobile terminal in a case where the image recording apparatus has a 3D Touch function in the illustrative embodiment according to one or more aspects of the disclosure.

FIG. 8A illustrates an example of the PIN entry screen in a case where the operating interface 24 includes the pressure sensor 24A. The PIN entry screen illustrated in FIG. 8A includes a message indicating, for example, that "ENTER THE PIN.", and entry location images 141, 142, 143, and 144. The apparatus program 35 accepts a touch operation on one of the entry location images 141, 142, 143, and 144 through the operating interface 24 (e.g., step S33). The apparatus program 35 stores information (e.g., "0b01", "0b10", or "0b11") corresponding to the accepted touch operation in the data storage area 32B as one of the digits of the PIN (e.g., step S34). For example, in response to acceptance of a tap operation on a location corresponding to the entry location image 141, a peek operation on a location corresponding to the entry location image 142, a pop operation on a location corresponding to the entry location image 143, and a pop operation on a location corresponding to the entry location image 144 through the operating interface 24 in this sequence, the apparatus program 35 generates a PIN "0b01101111" as the second authentication information.

Figure 8B:
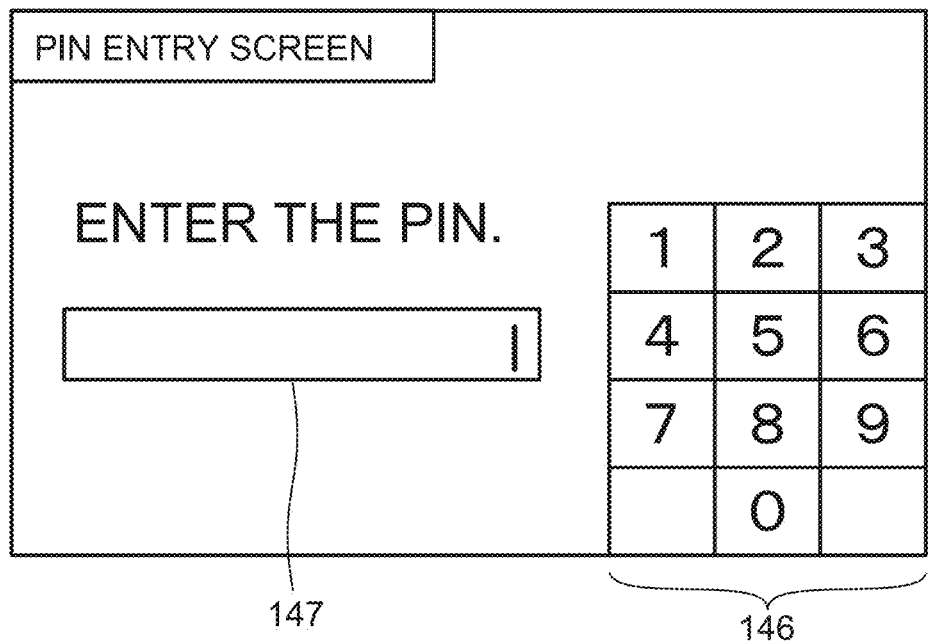
FIG. 8B illustrates an example PIN entry screen that is one of the example screens to be displayed on the display of the mobile terminal in a case where the image recording apparatus does not have the 3D Touch function in the illustrative embodiment according to one or more aspects of the disclosure.

FIG. 8B illustrates an example of the PIN entry screen in a case where the operating interface 24 does not include the pressure sensor 24A. The PIN entry screen illustrated in FIG. 8B includes a message indicating, for example, that "ENTER THE PIN.", a software keyboard 146, and a textbox 147. The apparatus program 35 accepts a touch operation on one of locations corresponding to symbols included in the software keyboard 146 through the operating interface 24 (e.g., step S33). The apparatus program 35 stores a symbol displayed on the location where the touch operation is accepted (e.g., "1", "7", or "4") in the data storage area 32B as one of the digits of the PIN (e.g., step S34). For example, in response to acceptance of a tap operation on a location where a symbol "1" is displayed, a tap operation on a location where a symbol "7" is displayed, a tap operation on a location where a symbol "4" is displayed, and a tap operation on a location where a symbol "4" is displayed through the operating interface 24 in this sequence, the apparatus program 35 generates a symbol string "1744" as the second authentication information. The symbol string generated in steps S33 and S35 is an example of a second symbol string.

The apparatus program 35 determines whether the PIN included in the received secure-printing instruction information (hereinafter, referred to as "the received PIN") matches the PIN which has been entered and stored in the data storage area 32B in steps S32 to S34 (hereinafter, referred to as "the entered PIN") (e.g., step S36). In a case where the received PIN matches the entered PIN (e.g., YES in step S36), the apparatus program 35 causes the printer unit 11 to perform printing (e.g., step S37).

That is, in step S37, the apparatus program 35 reads, from the data storage area 32B, the image data "photograph.JPEG" associated with the PIN "1744" authorized in step S36. Then, the printer unit 11 records an image represented by the image data "photograph.JPEG" read by the apparatus program 35, onto a sheet. The apparatus program 35 erases the PIN "1744" and the image data "photograph.JPEG" associated with each other from the data storage area 32B.

In a case where the received PIN does not match the entered PIN (e.g., NO in step S36), the apparatus program 35 displays an error screen (not illustrated) on the display 23 (e.g., step S38). The error screen includes a message indicating, for example, that "THE ENTERED PIN IS INVALID.", a [RE-ENTER] icon, and a [CANCEL] icon. The display 23 for displaying the error screen is another example of the notifying unit. Nevertheless, the notifying unit is not limited to the specific example. In other embodiments, for example, the notifying unit may be a speaker (not illustrated) for outputting guidance sound.

In a case where a tap operation on a location corresponding to the [RE-ENTER] icon included in the error screen is accepted through the operating interface 24 (e.g., RE-ENTER in step S39), the apparatus program 35 executes step S32 and its subsequent steps again. In a case where a tap operation on a location corresponding to the [CANCEL] icon included in the error screen is accepted through the operating interface 24 (e.g., CANCEL in step S39), the apparatus program 35 erases the PIN "1744" and the image data "photograph.JPEG" associated with each other from the data storage area 32B without executing step S37.

Effects Obtained by Illustrative Embodiment

According to the illustrative embodiment, different PINs may be generated in response to different touch operations (e.g., a tap operation, a peek operation, and a pop operation) on the respective locations corresponding to the entry location images 131, 132, 133, and 134. Therefore, as compared with a known PIN specification procedure in which a PIN is specified using a software keyboard, the configuration according to the illustrative embodiment may reduce a risk that the specified PIN is known to another person. Further, an application of such a PIN specification procedure to secure printing may reduce a risk that a sheet having sensitive information recorded thereon is taken away by another person.

According to the illustrative embodiment, an acceptance of entry of a PIN is notified to the user using the acceptance images "*" which are displayed on the locations corresponding to the entry location images 131, 132, 133, and 134. That is, the entered symbols might not be displayed on the display surface as they are. Accordingly, this configuration may further reduce a risk that the specified PIN is known to another person. Detection of a pop operation on any locations corresponding to the entry location images 131, 132, 133, and 134 is notified. Therefore, the user may be recognized that entry of which symbol has been accepted.

According to the illustrative embodiment, in a case where the operating interface 24 of the image recording apparatus 10 does not include the pressure sensor 24A, in the PIN specification process, a first symbol string assigned to touch operations is generated as a PIN. Therefore, even if the image recording apparatus 10 does not have a 3D Touch function, the image recording apparatus 10 may execute the authentication process. According to the illustrative embodiment, the correspondence between touch operations and symbols is established by the user immediately before the PIN specification process is executed, and therefore, this configuration may enable the user to enter the correct symbol string through the PIN entry screen illustrated in FIG. 8B. Nevertheless, a timing at which steps S14 to S16 are executed is not limited to the specific example of FIG. 3. In other embodiments, for example, steps S14 to S16 may be executed prior to execution of the printing instruction process.

[First Variation]

Referring to FIGS. 7A and 9A, a PIN specification procedure according to a first variation will be described. An explanation will be given mainly for the parts different from the first illustrative embodiment, and an explanation will be omitted for the common parts by assigning the same reference numerals thereto.

In the first variation, the terminal program 65 of the mobile terminal 50 accepts, in an arbitrary sequence, appropriate touch operations on the respective locations corresponding to the entry location images 131, 132, 133, and 134 on the PIN specification screen illustrated in FIG. 7A, through the operating interface 54 (e.g., steps S22 to S26). Based on signals outputted from the pressure sensor 54A and the location sensor 54B, the terminal program 65 generates a PIN including operation information and sequence information. The operation information indicates the touch operations performed on the respective locations corresponding to the entry location images 131, 132, 133, and 134. The sequence information indicates the sequence of touch operations that have been performed on the respective locations corresponding to the entry location images 131, 132, 133, and 134.

FIG. 9A illustrates an example PIN generated in a case where a peek operation on a location corresponding to the entry location image 134, a tap operation on a location corresponding to the entry location image 131, a pop operation on a location corresponding to the entry location image 133, and a peek operation on a location corresponding to the entry location image 132 are accepted in this sequence. In a case where the touch operations indicated by the operation information on the appropriate locations corresponding to the entry location images 141, 142, 143, and 144 (refer to FIG. 8A) are accepted in the sequence indicated by the sequence information, the apparatus program 35 of the image recording apparatus 10 that has received the PIN may determine that the received PIN matches the entered PIN (e.g., YES in step S36).

[Effects Obtained by First Variation]

As compared with the known PIN specification procedure in which a PIN is specified using a software keyboard, the configuration according to the first variation may reduce a risk that the specified PIN is known to another person. Further, different combinations of operation information and sequence information may increase variety of PINs that can be specified. Therefore, security may be improved with such a simple interface. The locations of the entry location images 131, 132, 133, and 134 are not limited to the specific example of FIG. 7A. In one example, the display surface may be divided into four sections vertically and horizontally by vertical and horizontal lines. In another example, the display surface may be divided into four sections diagonally by two diagonal lines.

[Second Variation]

Figure 10A:
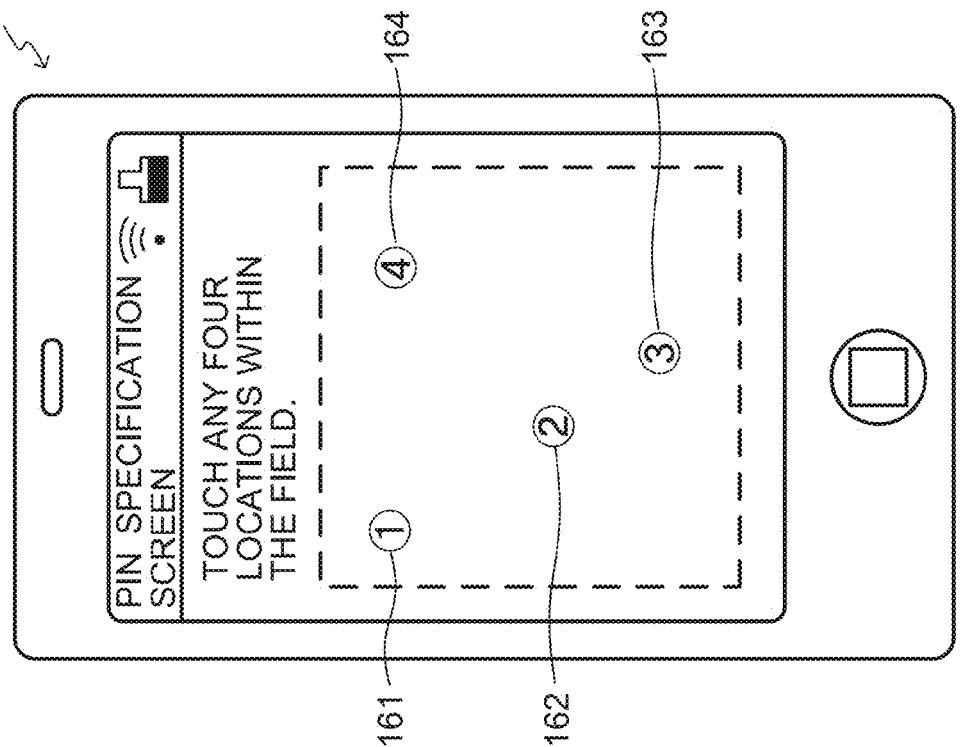
FIG. 10A illustrates an example PIN specification screen to be displayed before a touch operation is performed in the second variation of the illustrative embodiment according to one or more aspects of the disclosure.
Figure 10B:
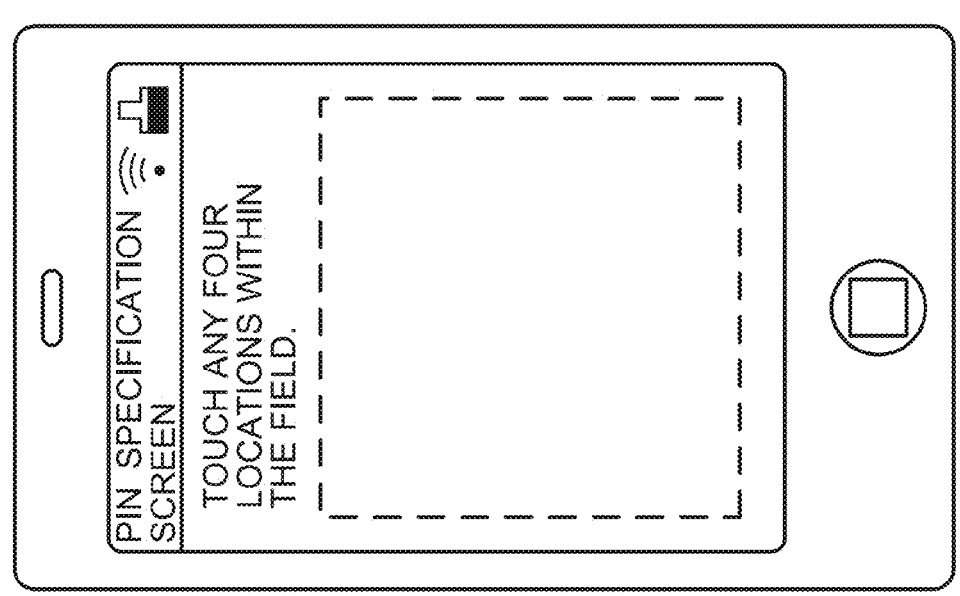
FIG. 10B illustrates an example PIN specification screen to be displayed after touch operations have been performed on four locations thereof in the second variation of the illustrative embodiment according to one or more aspects of the disclosure.

Referring to FIGS. 9B, 10A, and 10B, a PIN specification procedure according to a second variation will be described. An explanation will be given mainly for the parts different from the illustrative embodiment, and an explanation will be omitted for the common parts by assigning the same reference numerals thereto.

As illustrated in FIG. 10A, the terminal program 65 of the mobile terminal 50 displays a PIN specification screen on the display 53 (e.g., step S21). In FIG. 10A, the PIN specification screen includes a message indicating, for example, that "TOUCH ANY FOUR LOCATIONS WITHIN THE FIELD." and an entry field indicated by a dashed line. The entry field may be a square having a coordinate (0, 0) at an upper left corner and a coordinate (100, 100) at a lower right corner. An arbitrary location within the entry field is an example of an entry location.

The terminal program 65 accepts touch operations on arbitrary locations within the entry field (e.g., steps S22 to S26). For example, as illustrated in FIG. 10B, the terminal program 65 displays entry confirmation images 161, 162, 163, and 164 at the respective locations where the touch operations have been accepted. The entry confirmation images 161, 162, 163, and 164 may be displayed for notifying the user of the locations where the touch operations have been accepted and the sequence of touch operations. That is, FIG. 10B illustrates the PIN specification screen immediately after the touch operations have been performed on four locations thereof.

Based on signals outputted from the pressure sensor 54A and the location sensor 54B, the terminal program 65 generates a PIN including operation information and location information. The operation information indicates the touch operations that have been performed. The location information indicates the locations on the display surface where the respective touch operations have been performed. FIG. 9B illustrates an example PIN generated in a case where a tap operation on a location corresponding to the entry confirmation image 161, a peek operation on a location corresponding to the entry location image 162, a pop operation on a location corresponding to the entry location image 163, and a peek operation on a location corresponding to the entry location image 164 are accepted in this sequence. The terminal program 65 may acquire the location information by inputting the location signals outputted from the location sensor 54B into a prepared transfer function. The location information indicates coordinates of the locations where the touch operations have been performed within the entry field.

The apparatus program 35 of the image recording apparatus 10 that has received the PIN may display an entry field similar to the entry field illustrated in FIGS. 10A and 10B on the display 23. In a case where the touch operations indicated by the operation information on the respective appropriate locations indicated by the location information within the entry field are accepted, the apparatus program 35 may determine that the received PIN matches the entered PIN (e.g., YES in step S36). For example, in response to acceptance of an appropriate touch operation on an area within a predetermined radius of a corresponding one of the locations indicated by the location information, the apparatus program 35 may determine the touch operation is accepted on the corresponding one of the locations indicated by the location information.

[Effects Obtained by Second Variation]

As compared with the known PIN specification procedure in which a PIN is specified using a software keyboard, the configuration according to the second variation may reduce a risk that the specified PIN is known to another person. Different combinations of operation information and location information may increase variety of PINs that can be specified. Therefore, security may be improved with such a simple interface. According to the second variation, the entry confirmation images 161, 162, 163, and 164 are not displayed. Therefore, this configuration may further reduce a risk that the specified PIN is known to another person.

The PIN according to the second variation may further include the sequence information. The sequence information indicates the sequence of touch operations that have been performed on the respective locations corresponding to the entry confirmation images 161, 162, 163, and 164. That is, in a case where the touch operations indicated by the operation information on the appropriate locations indicated by the location information within the entry field are accepted in the sequence indicated by the sequence information, the apparatus program 35 may determine that the received PIN matches the entered PIN (e.g., YES in step S36).

[Third Variation]

Figure 7B:
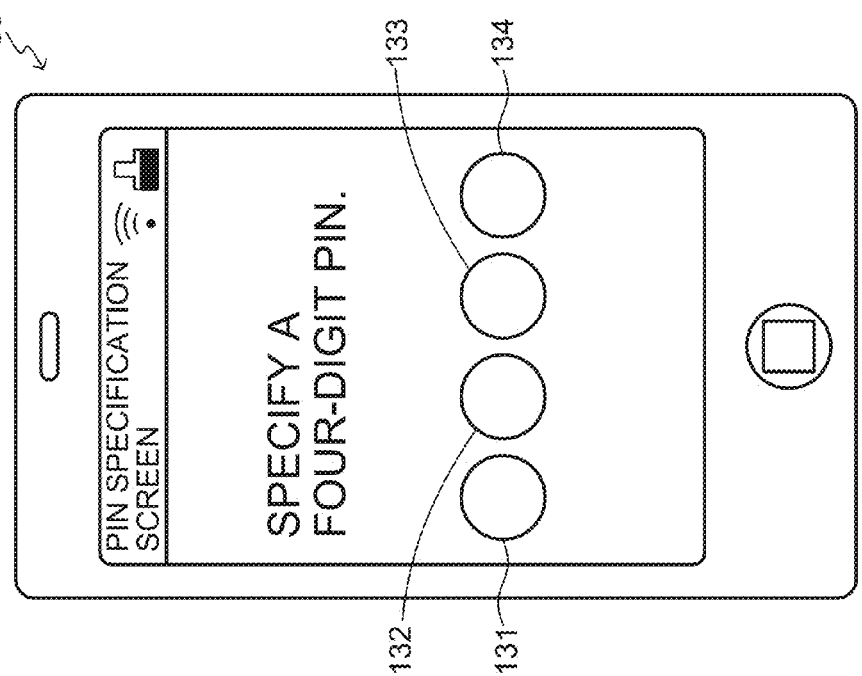
FIG. 7B illustrates another example PIN specification screen that is one of the example screens to be displayed on the display of the mobile terminal in third and fourth variations of the illustrative embodiment according to one or more aspects of the disclosure.
Figure 11A:
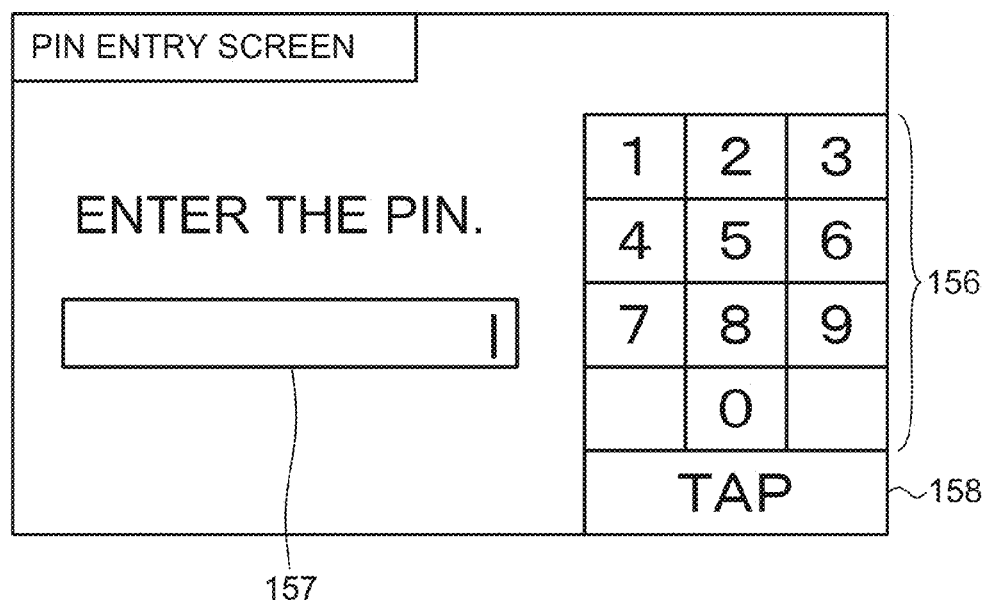
FIG. 11A illustrates an example PIN entry screen in the third variation of the illustrative embodiment according to one or more aspects of the disclosure, wherein "TAP" is displayed on a switch icon.
Figure 11B:
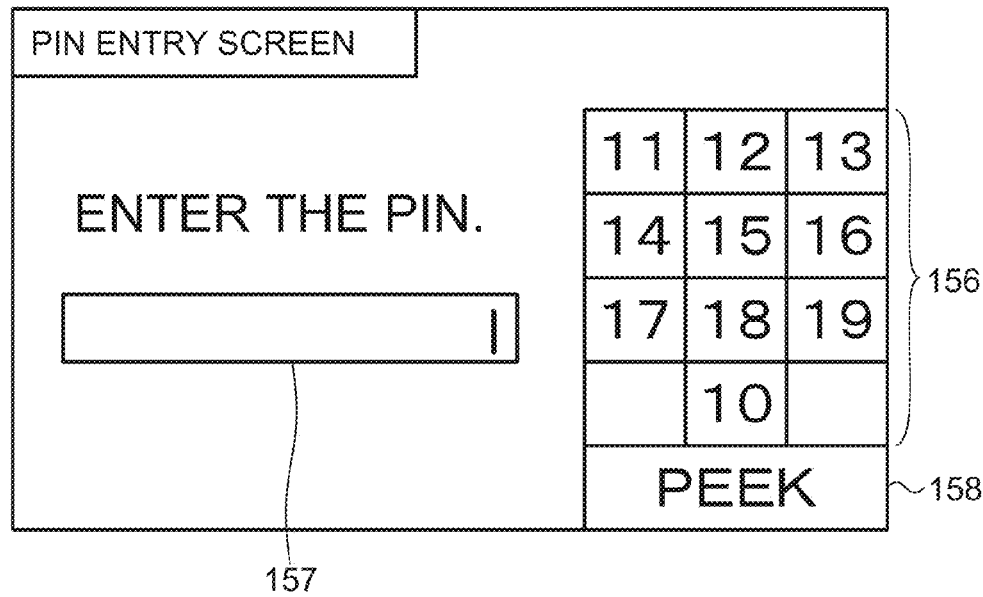
FIG. 11B illustrates another example PIN entry screen in the third variation of the illustrative embodiment according to one or more aspects of the disclosure, wherein "PEEK" is disposed on the switch icon.

Referring to FIGS. 7B, 11A, and 11B, a PIN specification procedure and a PIN entry manner according to a third variation will be described. An explanation will be given mainly for the parts different from the illustrative embodiment, and an explanation will be omitted for the common parts by assigning the same reference numerals thereto.

The terminal program 65 of the mobile terminal 50 displays a PIN specification screen of FIG. 7B on the display 53 (e.g., step S21). The PIN specification screen illustrated in FIG. 7B includes entry notification images 151, 152, 153, and 154 and a software keyboard 155. The entry notification images 151, 152, 153, and 154 each indicate whether a corresponding digit of the four-digit PIN has been entered. For example, each of the entry notification images 151, 152, 153, and 154 may be indicated by "O" before a touch operation is performed thereon, and may be indicated by "*" after a touch operation is performed thereon. The software keyboard 155 includes entry locations defined by rectangles, and numerals are displayed on the respective entry locations.

In a case where a tap operation on an entry location displaying, for example, a numeral "1", is accepted through the operating interface 54 (e.g., TAP in step S22), the terminal program 65 stores, in the data storage area 62B, the numeral "1" displayed at the entry location where the tap operation has been performed (e.g., step S23). In a case where a peek operation on the entry location displaying, for example, the numeral "1", is accepted through the operating interface 54 (e.g., PEEK in step S22), the terminal program 65 stores a numeral "11" in the data storage area 62B (e.g., step S24). In a case where a pop operation on the entry location displaying, for example, the numeral "1" is accepted through the operating interface 54 (e.g., POP in step S22), the terminal program 65 stores a numeral "101" in the data storage area 62B (e.g., step S25).

That is, in response to acceptance of a tap operation on the entry location, the terminal program 65 determines that the numeral "1" displayed on the entry location has been entered. In response to acceptance of a peek operation on the same entry location, the terminal program 65 determines that the numeral "11", which differs from the numeral "1", has been entered. In response to acceptance of a pop operation on the same entry location, the terminal program 65 determines that the numeral "101", which differs from the numeral "1", has been entered. The symbol "1" is another example of the first symbol. The symbol "11" is another example of the second symbol obtained by application of a first calculation (e.g., +10) to the first symbol (e.g., "1"). The symbol "101" is another example of the second symbol obtained by application of the first calculation (e.g., +100) to the first symbol (e.g., "1").

For example, in response to acceptance of a peek operation on a location corresponding to a numeral "3", a pop operation on a location corresponding to a numeral "2", a pop operation on a location corresponding to a numeral "8", and a tap operation on a location corresponding to a numeral "0" on the PIN specification screen illustrated in FIG. 7B in this sequence, the terminal program 65 generates a numeral string "131021080" as a PIN. Nevertheless, the first calculation is not limited to the specific example. In other embodiments or variations, for example, the first calculation may be subtraction, multiplication, division, or others. The description of the first calculation may be specified by the user, for example, in steps S13 to S15. In this case, the terminal program 65 may include calculation information indicating the description of the first calculation, in secure-printing instruction information transmitted in step S18.

The apparatus program 35 of the image recording apparatus 10 according to the third variation displays a PIN entry screen illustrated in FIG. 11A on the display 23 (e.g., step S32). The PIN entry screen illustrated in FIG. 11A includes a software keyboard 156, a textbox 157, and a switch icon 158. The software keyboard 156 accepts entry of a symbol. The textbox 157 displays one or more symbols entered through the software keyboard 156. The PIN entry screen illustrated in FIG. 11A is an example of a list screen in which candidate symbols are listed.

The switch icon 158 corresponds to an instruction for switching the display of the candidate symbols that can be entered through the software keyboard 156. For example, the apparatus program 35 switches a text string displayed on the switch icon 158 among "TAP", "PEEK", and "POP" in this sequence every time a tap operation is performed on the location corresponding to the switch icon 158. The apparatus program 35 also switches the display of the candidate symbols that can be entered through the software keyboard 156 every time a tap operation is performed on the location corresponding to the switch icon 158.

More specifically, for example, as illustrated in FIG. 11A, in a case where the text string indicates "TAP" on the switch icon 158, the apparatus program 35 lists, in the software keyboard 156, the symbols that can be entered by a tap operation on the PIN specification screen illustrated in FIG. 7B (e.g., "1", "2", . . . , and "9"). Each of the symbols displayed on the software keyboard 156 illustrated in FIG. 11A is an example of a first candidate symbol.

As illustrated in FIG. 11B, in a case where the text string indicates "PEEK" on the switch icon 158, the apparatus program 35 lists, in the software keyboard 156, the symbols that can be entered by a peek operation on the PIN specification screen illustrated in FIG. 7B (e.g., "11", "12", . . . , and "19"). Each of the symbols displayed on the software keyboard 156 illustrated in FIG. 11B is an example of a second candidate symbol. In a case where the text string indicates "POP" on the switch icon 158, the apparatus program 35 lists, in the software keyboard 156, the symbols that can be entered by a pop operation on the PIN specification screen illustrated in FIG. 7B (e.g., "101", "102", . . . , and "109"). Each of the symbols displayed on the software keyboard 156 is another example of the second candidate symbol.

In response to acceptance of a tap operation on one of entry locations of the software keyboard 156 through the operating interface 24 (e.g., YES in step S33), the apparatus program 35 stores, in the data storage area 32B, the symbol displayed at the entry location where the tap operation has been performed (e.g., step S34). For example, in order for the user to enter the number string "131021080" specified in the above-described example, the user taps a location corresponding to a numeral "13" on the PIN entry screen (refer to FIG. 11B), a location corresponding to the switch icon 158, a location corresponding to a numeral "102" on the PIN entry screen (not illustrated), a location corresponding to a numeral "108" on the PIN entry screen (not illustrated), a location corresponding to the switch icon 158, and a location corresponding to a numeral "0" on the PIN entry screen (refer to FIG. 11A) in this sequence. The tap operation on the location corresponding to the switch icon 158 is an example of a switching operation. The tap operation on one of the entry locations of the software keyboard 156 is an example of a second specification operation.

[Effects Obtained by Third Variation]

As compared with the known PIN specification procedure in which a PIN is specified using a software keyboard, the configuration according to the third variation may reduce a risk that the specified PIN is known to another person. Even if the image recording apparatus 10 does not have a 3D Touch function, the image recording apparatus 10 may execute the authentication process. Switching of the display of the candidate symbols that can be entered through the software keyboard 156 may enable the user to readily enter the PIN into the image recording apparatus 10 without the apparatus program 35 performing the first calculation.

According to the third variation, a tap operation, a peek operation, and a pop operation on the same entry location are assigned with the respective numerals having different number of digits (e.g., the numeral "1", "11", or "101"). With this configuration, in the specification device according to the third variation, variable-length PINs may be specified. Accordingly, security may be further improved. In the authentication device according to the third variation, using the switch icon 158 to enter a PIN may enable the user to enter the PIN with less operations as compared with a case where the PIN is entered using a known software keyboard. Nevertheless, in other embodiments or variations, for example, the user may enter one by one each digit of the PIN "131021080" in this sequence using the software keyboard 156 illustrated in FIG. 11A. That is, the switch icon 158 may be omitted.

[Fourth Variation]

Referring to FIGS. 7B, 12A, and 12B, a PIN specification procedure according to a fourth variation will be described. An explanation will be given mainly for the parts different from the illustrative embodiment, and an explanation will be omitted for the common parts by assigning the same reference numerals thereto.

In a case where the first orientation signal is outputted from the orientation sensor 52, the terminal program 65 according to the fourth variation displays the PIN specification screen illustrated in FIG. 7B on the display 53 (e.g., step S21). That is, the PIN specification screen illustrated in FIG. 7B is displayed on the display 53 when the mobile terminal 50 is held such that the longer sides of the display surface extend along the vertical direction. Symbols that can be entered through the PIN specification screen illustrated in FIG. 7B may be the same or similar to the symbols used in the third variation, and therefore, an explanation of the symbols will be omitted.

In a case where the second orientation signal is outputted from the orientation sensor 52 and "OFF" is specified for the orientation information, the terminal program 65 displays a PIN specification screen illustrated in FIG. 12A on the display 53 (e.g., step S21). That is, the PIN specification screen illustrated in FIG. 12A is displayed on the display 53 when the mobile terminal 50 is held with the shorter sides of the display surface extending along the vertical direction and the mobile terminal 50 is in a mode in which the top to bottom orientation of symbols always corresponds to the direction that the longer sides of the mobile terminal 50 extends. Although a software keyboard 155A illustrated in FIG. 12A displays symbols that differ from the symbols displayed in the software keyboard 155, the software keyboard 155A has the same or similar configuration to the software keyboard 155.

As illustrated in FIG. 12A, the software keyboard 155A displays numerals (e.g., "3", "6", . . . , and "27"), each of which can be entered by a tap operation. Each of the symbols illustrated in FIG. 12A is an example of a third symbol obtained by application of a second calculation (e.g., ×3) to each numeral (e.g., "1", "2", . . . , and "9") that can be entered by a tap operation on the PIN specification screen illustrated in FIG. 7B. In response to acceptance of a tap operation on an entry location displaying, for example, a numeral "15", through the operating interface 54 (e.g., TAP in step S22), the terminal program 65 stores, in the data storage area 62B, the numeral "15" displayed at the entry location where the tap operation has been performed (e.g., step S23).

In response to acceptance of a peek operation on an entry location displaying, for example, the numeral "15", through the operating interface 54 (e.g., PEEK in step S22), the terminal program 65 stores, in the data storage area 62B, a numeral "45" assigned to the peek operation (e.g., step S24). The numeral "45" is an example of a fourth symbol obtained by which the second calculation (e.g., ×3) is applied to the numeral "15" that can be entered by a peek operation on the PIN specification screen illustrated in FIG. 7B. In response to acceptance of a pop operation on an entry location displaying, for example, the numeral "15", through the operating interface 54 (e.g., POP in step S22), the terminal program 65 stores, in the data storage area 62B, a numeral "315" assigned to the pop operation (e.g., step S25). The numeral "315" is another example of the fourth symbol obtained by application of the second calculation (e.g., ×3) to a numeral "105" that can be entered by a pop operation on the PIN specification screen illustrated in FIG. 7B.

In a case where the second orientation signal is outputted from the orientation sensor 52 and "ON" is specified for the orientation information, the terminal program 65 displays a PIN specification screen illustrated in FIG. 12B on the display 53 (e.g., step S21). That is, the PIN specification screen illustrated in FIG. 12B is displayed on the display 53 when the mobile terminal 50 is held with the shorter sides of the display surface extending along the vertical direction and the mobile terminal 50 is in a mode in which the top to bottom orientation of symbols is changed in accordance with the orientation of the mobile terminal 50. Although a software keyboard 155B illustrated in FIG. 12B displays symbols whose top to bottom orientation differ from the top to bottom orientation of the symbols displayed in the software keyboard 155, the software keyboard 155B has the same or similar configuration to the software keyboard 155.

As illustrated in FIG. 12B, the software keyboard 155B displays numerals (e.g., "6", "12", . . . , and "54"), each of which can be entered by a tap operation. Each of the symbols illustrated in FIG. 12B is an example of a fifth symbol obtained by application of a third calculation (e.g., ×6) to each numeral (e.g., "1", "2", . . . , and "9") that can be entered by a tap operation on the PIN specification screen illustrated in FIG. 7B. In response to acceptance of a tap operation on an entry location displaying, for example, a numeral "30", through the operating interface 54 (e.g., TAP in step S22), the terminal program 65 stores, in the data storage area 62B, the numeral "30" displayed at the entry location where the tap operation has been performed (e.g., step S23).

In response to acceptance of a peek operation on an entry location displaying, for example, the numeral "30", through the operating interface 54 (e.g., PEEK in step S22), the terminal program 65 stores, in the data storage area 62B, a numeral "90" assigned to the peek operation (e.g., step S24). The numeral "90" is an example of a sixth symbol obtained by which the third calculation (e.g., ×6) is applied to the numeral "15" that can be entered by a peek operation on the PIN specification screen illustrated in FIG. 7B. In response to acceptance of a pop operation on an entry location displaying, for example, the numeral "30", through the operating interface 54 (e.g., POP in step S22), the terminal program 65 stores, in the data storage area 62B, a numeral "630" assigned to the pop operation (e.g., step S25). The numeral "630" is another example of the sixth symbol obtained by application of the third calculation (e.g., ×6) to a numeral "105" that can be entered by a pop operation on the PIN specification screen illustrated in FIG. 7B.

[Effects Obtained by Fourth Variation]

According to the fourth variation, variety of symbols that can be entered in response to different touch operations on the same entry location may be further increased. This configuration may enable the user to enter a desired symbol with less operations in a device equipped with a relatively-small-sized display surface, such as the mobile terminal 50.

In the fourth variation, the symbols listed in each of the software keyboards 155, 155A, and 155B are changed based on the orientation signal outputted from the orientation sensor 52 and the value specified for the orientation information. Nevertheless, in another example, the same symbols as the symbols listed in the software keyboard 155 may be displayed on each of the software keyboards 155A and 155B without being changed.

In the fourth variation, the variety of the symbols to be entered is increased by different combinations of orientation signals outputted from the orientation sensor 52 and values to be specified for the orientation information. Nevertheless, parameters used for changing the symbols to be entered are not limited to the specific examples.

In one example, the mobile terminal 50 may further include a brightness sensor for detecting ambient brightness. In this case, the terminal program 65 may assign different symbols to the same touch operation on the same entry location between a case where brightness detected by the brightness sensor is lower than a threshold and a case where the brightness is greater than or equal to the threshold.

In another example, the mobile terminal 50 may further include a Global Positioning System ("GPS") for detecting a present location. In this case, the terminal program 65 may assign different symbols to the same touch operation on the sane entry location between a case where the present location of the mobile terminal 50 indicated by the GPS is within a predetermined specified area (e.g., within the premises of home or within the premises of an office/workplace) and a case where the present location of the mobile terminal 50 indicated by the GPS is out of the predetermined specified area.

[Other Variations]

Either or both of the PIN specification screens and the PIN entry screens, in particular, the PIN specification screens illustrated in FIGS. 7B, 12A, and 12B, may be used not only as an interface for accepting entry of PINs but also as an interface for accepting entry of general symbol strings. In response to acceptance of a tap operation on an entry location displaying, for example, a numeral "5" in FIG. 7B, the terminal program 65 may determine that "five" indicated by the Arabic numeral has been entered. In response to acceptance of a peek operation on the same entry location displaying, for example, the numeral "5" in FIG. 7B, the terminal program 65 may determine that "five" indicated by the Roman numeral has been entered. In response to acceptance of a pop operation on the same entry location displaying, for example, the numeral "5" in FIG. 7B, the terminal program 65 may determine that "five" indicated by the Chinese/Kanji numeral has been entered.

As described above, in accordance with different touch operations on the same entry location, the terminal program 65 may determine that different symbols that have the same meaning but have respective different shapes have been entered. The symbols that have the same meaning but have respective different shapes are not limited to the specific example, and may include symbols indicated by one of, for example, an uppercase alphabet letter, a lowercase alphabet letter, a hiragana character, a katakana character, a single-width character, and a double-width character. In another example, symbols having respective different meanings may be assigned to different touch operations on the same entry location. For example, a hiragana character may be assigned to a tap operation on a particular entry location, an alphabet letter may be assigned to a peek operation on the same entry location, and a numeral may be assigned to a pop operation on the same entry location.

In the illustrative embodiment and variations, different symbols are assigned to a tap operation, a peek operation, and a pop operation, respectively, on the same entry location. Nevertheless, the touch operations to which different symbols are assigned are not limited to the specific example. In one example, a peek operation may be omitted. In another example, different symbols may be assigned to a tap operation and a long touch operation on the same entry location. In this case, the pressure sensors 24A and 54A may be omitted.

The symbol entry device according to the illustrative embodiment and variations may be applied not only to the image recording apparatus 10 and the mobile terminal 50 but also to any devices including a touch panel display, e.g., automatic teller machines ("ATMs"), ticket machines, or car navigation systems.

The example has been described in which each of the processes executed by a controller is implemented by which the programs stored in the program storage areas 32A and 62A of the memories 32 and 62 are executed by the CPUs 31 and 61 in the image recording apparatus 10 and the mobile terminal 50, respectively. Nevertheless, the configuration of the controller is not limited to the specific example. In other embodiments or variations, for example, at least one or all of the processes may be implemented by hardware, e.g., an integrated circuit.

The disclosure may be implemented not only as the image recording apparatus 10 and the mobile terminal 50 but also as a program that causes the image recording apparatus 10 and the mobile terminal 50 to execute the processes. The program may be supplied with being recorded on a non-transitory recording medium. The non-transitory recording medium may include a memory of a server that is configured to connect the image recording apparatus 10 and the mobile terminal 50 through the communication network 101, as well as CD-ROMs and DVD-ROMs. The program stored in the memory of the server may be distributed through the communication network 101, e.g., the Internet, as information or signals indicating the program.

What is claimed is:

1. A non-transitory computer-readable storage medium storing computer-readable instructions executable by a processor of a symbol entry device comprising a display having a display surface, a first touch sensor and a second touch sensor, wherein the first touch sensor comprises a location sensor and the second touch sensor comprises a sensor of a different type as compared to the location sensor,
  wherein the instructions, when executed by the processor, cause the symbol entry device to execute:
    displaying, on the display surface, an entry screen including a plurality of entry locations, each of the plurality of entry locations being assigned a first symbol and a second symbol, the first symbol being displayed at each entry location and the second symbol not being displayed at each entry location of the plurality of entry locations;
    receiving a location signal from the first touch sensor and one of a first operation signal and a second operation signal from the second touch sensor in response to a touch operation on the display surface,
      the first operation signal being generated by the second touch sensor in response to the touch operation being a first touch operation, and
      the second operation signal being generated by the second touch sensor in response to the touch operation being a second touch operation different from the first touch operation,
      wherein the first touch operation and the second touch operation occur at a same one entry location on the display surface selected from among a plurality of entry locations;
    determining, in response to receiving the first operation signal from the second touch sensor and receiving the location signal from the first touch sensor, that the first symbol associated with an entry location has been entered; and
    determining, in response to receiving the second operation signal from the second touch sensor and receiving the location signal from the first touch sensor, that the second symbol associated with the entry location and different from the first symbol has been entered; and
    based on whether the first operation signal or second operation signal is received, storing information corresponding to a determined symbol in memory for inclusion in authentication information, the determined symbol being based on one of the first symbol or the second symbol.

2. The non-transitory computer-readable storage medium according to claim 1, wherein the second touch sensor is selected from a group consisting of a pressure sensor, an orientation sensor, and a brightness sensor.

3. The non-transitory computer-readable storage medium according to claim 1, wherein the authentication information is used to authorize a printing operation of an image recording apparatus.

4. The non-transitory computer-readable storage medium according to claim 3, wherein the instructions, when executed by the processor, further cause the symbol entry device to transmit to an image recording apparatus the authentication information.

5. The non-transitory computer-readable storage medium according to claim 1, wherein determining that the first symbol associated with the entry location has been entered is further based on a touch location signal from the location sensor.

6. The non-transitory computer-readable storage medium according to claim 1, wherein the instructions, when executed by the processor, further cause the symbol entry device to display, on the display surface, the entry screen including the first symbol displayed at the entry location.

7. The non-transitory computer-readable storage medium according to claim 6,
  wherein the first symbol and the second symbol represent the same description while the first symbol and the second symbol have respective different shapes.

8. The non-transitory computer-readable storage medium according to claim 1,
  wherein the first symbol represents a numeral, and
  wherein the second symbol represents a numeral obtained by application of a predetermined first calculation to the first symbol.

9. The non-transitory computer-readable storage medium according to claim 1,
  wherein determining that the first symbol has been entered is further based on receipt of a first orientation signal from an orientation sensor of the symbol entry device;
  wherein determining that the second symbol has been entered is further based on receipt of the first orientation signal from the orientation sensor of the symbol entry device; and
  wherein the instructions, when executed by the processor, further cause the symbol entry device to perform:
    determining, in response to receipt of a second orientation signal from the orientation sensor and the first operation signal, that a third symbol has been entered, the third symbol representing a numeral obtained by application of a predetermined second calculation to the first symbol; and
    determining, in response to receipt of the second orientation signal from the orientation sensor and the second operation signal, that a fourth symbol has been entered, the fourth symbol representing a numeral obtained by application of the predetermined second calculation to the second symbol.

10. The non-transitory computer-readable storage medium according to claim 9,
  wherein determining that the third symbol has been entered is further based on a first setting value specified in orientation information, the first setting value corresponding to display, at the entry location, of the first symbol with its top and bottom orientation corresponding to a direction that longer sides of the display surface extends;
  wherein determining that the fourth symbol has been entered is further based on the first setting value being specified in the orientation information; and
  wherein the instructions, when executed by the processor, further cause the symbol entry device to perform:
    determining that a fifth symbol has been entered in response to (1) a second setting value specified in orientation information, (2) receipt of the second orientation signal from the orientation sensor, and (3) receipt of the first operation signal, wherein the second setting value corresponds to display, at the entry location, of the first symbol with its top and bottom orientation corresponding to a vertical direction, and wherein the fifth symbol represents a numeral obtained by application of a predetermined third calculation to the first symbol;
    determining that a sixth symbol has been entered in response to (1) a second setting value specified in orientation information, (2) receipt of the second orientation signal from the orientation sensor, and (3) receipt of the second operation signal, and wherein the sixth symbol represents a numeral obtained by application of the predetermined third calculation to the second symbol.

11. The non-transitory computer-readable storage medium according to claim 1, wherein the instructions, when executed by the processor, further cause the symbol entry device to perform:
displaying an acceptance image at the entry location in response to the touch operation at the one entry location on the display surface, the acceptance image indicating an acceptance of an entry of one of the first and second symbols and being different from both of the first symbol and the second symbol.

12. The non-transitory computer-readable storage medium according to claim 1, wherein the instructions, when executed by the processor, further cause the symbol entry device to perform:
accepting, through the second touch sensor, the touch operation to be assigned to each of the first symbol and the second symbol;
determining that the first symbol has been entered; and
determining that the second symbol has been entered.

13. The non-transitory computer-readable storage medium according to claim 12, wherein the instructions, when executed by the processor, further cause the symbol entry device to perform:
in response to receiving the second operation signal from the second touch sensor, causing a notifying device to notify that a second operation has been accepted.

14. The non-transitory computer-readable storage medium according to claim 1,
wherein the second touch sensor is configured to output the operation signal corresponding to pressure applied to the display surface,
wherein the first operation signal indicates that the pressure applied to the entry location is smaller than a threshold, and
wherein the second operation signal indicates that the pressure applied to the entry location is equal or larger than the threshold.

15. The non-transitory computer-readable storage medium according to claim 1, wherein the first symbol displayed at each of the plurality of entry locations is different from a first symbol displayed at others of the plurality of entry locations.

16. The non-transitory computer-readable storage medium according to claim 1, wherein the entry screen further includes a symbol notification region and a symbol entry region including the plurality of entry locations.

17. The non-transitory computer-readable storage medium according to claim 16, wherein the instructions, when executed by the processor, further cause the symbol entry device to:
display, on the display surface, an entry screen including a symbol notification region and a symbol entry region including a plurality of entry locations, each of the plurality of entry locations being assigned a first symbol and a second symbol selectable for inclusion in authentication information that are different from first and second symbols of the others of the plurality of entry locations; and
in response to receiving an operation signal selected from among the first operation signal and the second operation signal, displaying a confirmation image in the symbol notification region.

18. A method comprising:
displaying, on a display surface of a symbol entry device, an entry screen including a plurality of entry locations, each of the plurality of entry locations being assigned a first symbol and a second symbol, the first symbol being displayed at each entry location and the second symbol not being displayed at each entry location of the plurality of entry locations;
receiving, in response to a touch operation at one entry location on the display surface selected from among a plurality of entry locations, (1) a location signal from a location sensor of the symbol entry device and (2) one of a first operation signal and a second operation signal from a touch sensor of the symbol entry device of a different type as compared to the location sensor, the first operation signal indicating a first touch operation and the second operation signal indicating a second touch operation, the second touch operation being different from the first touch operation, and wherein the first touch operation and the second touch operation occur at a same one entry location on the display surface selected from among a plurality of entry locations;
determining, in response to receiving the first operation signal from the touch sensor and receiving the location signal from the location sensor, that the first symbol associated with an entry location has been entered; and
determining, in response to receiving the second operation signal from the touch sensor and receiving the location signal from the location sensor, that the second symbol associated with the entry location and different from the first symbol has been entered; and
based on whether the first operation signal or second operation signal is received, storing information corresponding to a determined symbol in a memory of the symbol entry device for inclusion in authentication information, the determined symbol being based on one of the first symbol or the second symbol.

19. The method of claim 18, further comprising transmitting the authentication information to an authentication device remote from the symbol entry device.

20. A system comprising:
a symbol entry device comprising:
a display having a display surface;
a first touch sensor comprising a location sensor;
a second touch sensor comprising a sensor of a different type as compared to the location sensor, the second touch sensor configured to output one of a first operation signal and a second operation signal in response to a touch operation on the display surface;
a processor; and
a memory storing computer-readable instructions therein,
wherein the instructions, when executed by the processor, cause the processor to perform:
displaying, on the display surface, an entry screen including a plurality of entry locations, each of the plurality of entry locations being assigned a first symbol and a second symbol, the first symbol being displayed at each entry location and the second symbol not being displayed at each entry location of the plurality of entry locations;
receiving a location signal from the first touch sensor and one of the first operation signal and the second operation signal from the second touch sensor in response to the touch operation on the display surface,
the first operation signal being generated by the second touch sensor in response to the touch operation being a first touch operation, and the second operation signal being generated by the second touch sensor in response to the touch operation being a second touch operation different from the first touch operation,
wherein the first touch operation and the second touch operation occur at a same one entry location on the display surface selected from among a plurality of entry locations;
determining, in response to receiving the first operation signal from the second touch sensor and receiving the location signal from the first touch sensor, that the first symbol associated with an entry location has been entered; and
determining, in response to receiving the second operation signal from the second touch sensor and receiving the location signal from the first touch sensor, that the second symbol associated with the entry location and different from the first symbol has been entered; and
based on whether the first operation signal or second operation signal is received, storing information corresponding to a determined symbol in the memory for inclusion in authentication information, the determined symbol being based on one of the first symbol or the second symbol.

21. The system according to claim 20, wherein the symbol entry device further includes a first communication interface, and wherein the instructions, when executed by the processor, cause the processor to further perform:
transmitting the authentication information as first authentication information to an authentication device remote from the symbol entry device via the first communication interface.

22. The system according to claim 21, further comprising the authentication device remote from and communicatively connected to the symbol entry device, the authentication device comprising:
an image processing unit;
an operating interface;
a second communication interface;
a second processor; and
a second memory storing computer-readable instructions,
wherein the instructions, when executed by the processor, cause the second processor to perform:
receiving the authentication information from the symbol entry device through the second communication interface;
accepting entry of second authentication information through the operating interface;
determining whether the authentication information matches the second authentication information; and
controlling the image processing unit to operate in response to determining that the authentication information matches the second authentication information.

23. The system according to claim 22, wherein the image processing unit includes an image recording unit configured to record an image represented by image data on a recording medium,
wherein the instructions, when executed by the processor of the symbol entry device, further cause the processor to perform:
transmitting the image data to the authentication device through the first communication interface; and
wherein the instructions, when executed by the second processor of the authentication device, further cause the second processor to perform:
receiving the image data from the symbol entry device through the second communication interface; and
controlling the image recording unit to record, on the recording medium, the image represented by the image data.

24. The system according to claim 22,
wherein the instructions, when executed by the processor of the symbol entry device, further cause the processor to perform:
generating a first symbol string as the authentication information, the first symbol string comprising a plurality of symbols including the determined symbol and are arranged in accordance with a sequence in which operation signals are outputted from the second touch sensor;
wherein the instructions, when executed by the second processor of the authentication device, further cause the second processor to perform:
accepting entry of a second symbol string as the second authentication information, the second symbol string including symbols arranged in accordance with a sequence in which entry of the symbols is accepted through the operating interface.

25. The system according to claim 22,
wherein the symbol entry device further comprises a first operating interface;
wherein the instructions, when executed by the processor of the symbol entry device, further cause the processor to perform:
accepting, through the first operating interface, a first assignment operation in which a symbol is assigned to each of the first operation signal and the second operation signal,
wherein the instructions, when executed by the second processor of the authentication device, further cause the second processor to perform:
generating the first symbol string based on the symbol assigned by the first assignment operation, in accordance with the sequence in which entry of the symbols is accepted through the operating interface.

26. The system according to claim 22,
wherein the instructions, when executed by the processor of the symbol entry device, further cause the processor to perform:
determining whether the operating interface of the authentication device has a function of outputting different operation signals in accordance with different touch operations on a single entry location; and
wherein the instructions, when executed by the second processor of the authentication device, further cause the second processor to perform:
generating a first symbol string in response to determining that the operating interface does not have the function of outputting different operation signals in accordance with different touch operations on the single entry location.

27. The system according to claim 22,
wherein a first symbol corresponding to the first operation signal represents a numeral,
wherein a second symbol corresponding to the second operation signal represents a numeral obtained by application of a predetermined calculation to the first symbol,
wherein the authentication device further comprises a second display having a second display surface, and wherein the instructions, when executed by the second processor of the authentication device, further cause the second processor to perform:

displaying, on the second display, a list screen including at least one of a plurality of first candidate symbols that are a candidate for the first symbol and a plurality of second candidate symbols that are a candidate for the second symbol;

accepting, through the operating interface, a switch operation for switching the candidate symbols included in the list screen and a second assignment operation for assigning one of the plurality of candidate symbols included in the list screen.

28. The system according to claim 22, wherein the authentication device further comprises a notifying unit;

wherein the instructions, when executed by the second processor of the authentication device, further cause the second processor to perform:

notifying, in response to determining that the first authentication information does not match the second authentication information, that the first authentication information does not match the second authentication information.

29. The system according to claim 21, wherein the instructions, when executed by the processor of the symbol entry device, further cause the processor to perform:

accepting a plurality of touch operations through the first touch sensor and the second touch sensor; and generating the first authentication information including operation information indicating each of the plurality of touch operations and sequence information indicating a sequence of the touch operations that have been performed on the respective entry locations.

30. The system according to claim 21, wherein the operation signal further indicates a location on the display of the symbol entry device where the touch operation have been performed;

wherein the instructions, when executed by the processor, further cause the processor to perform:

accepting a plurality of touch operations through the first touch sensor and the second touch sensor;

generating the first authentication information including operation information indicating each of the plurality of touch operations and location information indicating each of locations on the display surface of the symbol entry device where each of the plurality of touch operations have been performed.

31. A non-transitory computer-readable storage medium storing computer-readable instructions executable by a processor of a symbol entry device comprising a display having a display surface, and a pressure sensor, wherein the instructions, when executed by the processor, cause the symbol entry device to execute:

displaying, on the display surface, an entry screen including a plurality of entry locations, each of the plurality of entry locations being assigned a first symbol and a second symbol, the first symbol being displayed at each entry location and the second symbol not being displayed at each entry location of the plurality of entry locations;

receiving one of a first operation signal and a second operation signal from the pressure sensor in response to a touch operation on the display surface, the first operation signal being generated by the pressure sensor in response to the touch operation being a first touch operation having a pressure below a threshold, and the second operation signal being generated by the pressure sensor in response to the touch operation being a second touch operation having a pressure above the threshold, wherein the first touch operation and the second touch operation occur at a same one entry location on the display surface selected from among a plurality of entry locations;

determining, in response to receiving the first operation signal from the pressure sensor, that a first symbol associated with an entry location has been entered;

determining, in response to receiving the second operation signal from the pressure sensor, that a second symbol associated with the entry location and different from the first symbol has been entered; and based on whether the first operation signal or second operation signal is received, storing information corresponding to a determined symbol in memory for inclusion in authentication information, the determined symbol being based on one of the first symbol or the second symbol.

\* \* \* \* \*